United States Patent
Wolfer et al.

[11] Patent Number: 6,123,020
[45] Date of Patent: Sep. 26, 2000

[54] PRINTER AND DISK DISPENSER COMBINATION

[76] Inventors: David Wolfer, 1624 Daily Ct., San Leandro, Calif. 94577; Wray Russ, 143 Lynn St., Brentwood, Calif. 94513

[21] Appl. No.: 09/042,147

[22] Filed: Mar. 13, 1998

[51] Int. Cl.[7] .................................................. B41F 17/00
[52] U.S. Cl. ............................. 101/35; 101/44; 414/797.9
[58] Field of Search ................................. 101/35, 36, 37, 101/43, 44; 369/34; 414/797.4, 797.9, 798

[56] References Cited

U.S. PATENT DOCUMENTS

| | | | |
|---|---|---|---|
| 4,195,961 | 4/1980 | Waiblinger | 414/120 |
| 4,417,757 | 11/1983 | Morrison | 294/26 |
| 4,470,137 | 9/1984 | Tago | 369/100 |
| 4,504,186 | 3/1985 | Richards | 414/744 |
| 4,595,481 | 6/1986 | Allen et al. | 204/298 |
| 4,726,615 | 2/1988 | Goldberg | 294/16 |
| 4,735,540 | 4/1988 | Allen et al. | 414/222 |
| 4,921,397 | 5/1990 | Wantanabe | 414/788.4 |
| 5,110,167 | 5/1992 | Friend | 294/16 |
| 5,397,214 | 3/1995 | Chueng | 414/796.7 |
| 5,505,509 | 4/1996 | Vance | 294/16 |
| 5,520,106 | 5/1996 | Karlyn et al. | 101/35 |
| 5,520,107 | 5/1996 | Airoldi | 101/35 |
| 5,692,878 | 12/1997 | Freund | 414/719.6 |
| 5,734,629 | 3/1998 | Lee et al. | 369/34 |
| 5,865,114 | 2/1999 | Averill et al. | 101/37 |

OTHER PUBLICATIONS

EMEDIA Professional, "Buyers Guide to CD Duplication Systems—40 New towers autoloaders jukeboxes", Nov. 1997.

*Primary Examiner*—Ren Yan
*Attorney, Agent, or Firm*—Kevin H. Fortin, Esq.

[57] ABSTRACT

A system uses a disk dispenser to dispense memory storage disks including CD's and the like to the printer. The system includes a housing, a disk dispenser and a printer. The disk dispenser can be affixed to the housing, or mounted on a turntable. The disk dispenser includes an upper guide and a lower guide attached to the upper guide. The upper and lower guides are formed with axially offset openings. The lower guide has a rim for supporting a disk. A plate mounts between the lower guide and the upper guide. The plate has an arced edge for contacting a disk. The plate slides, causing the arced edge of the plate to dispense the disk through the opening in the lower guide to the printer.

9 Claims, 18 Drawing Sheets

FIG.—30

PRINTER AND DISK DISPENSER COMBINATION

CROSS-REFERENCE TO RELATED APPLICATIONS

This invention relates in subject matter to commonly assigned U.S. Pat. applications Ser. Nos. (not yet assigned), both filed on Mar. 6, 1998, and entitled DISK DISPENSER, and ROTATABLE SYSTEM AND METHOD FOR HANDLING MEMORY STORAGE DISKS, respectively.

FIELD OF THE INVENTION

This invention relates to disk handling systems and particularly to handling systems having a disk printer, which prints indicia on memory storage disks.

BACKGROUND OF THE INVENTION

CD duplication systems, such as marketed under the trade name CD Works™, include a bank of CD recorders, a disk printer and a gantry for moving disks from the recorders to the printer. The recorders and disk printer align to enable the gantry to reciprocate along the recorders and disk printer. The robotic arm has a gripper for lifting and lowering the memory storage disks. Such systems require a significant amount of space.

Another CD duplication system with a printer is marketed in the US by Microboards Technology, Inc. This design includes a CD hopper, stacked CD recorders, a printer and a gantry for moving disks from the hopper to the recorder and printer. The printer stacks above the recorders. The gantry is fixed adjacent the stack and includes an arm which grips disks and moves the disks up and down from the hopper to the recorder and the printer, respectively. This system consumes relatively less desktop space than the CD Works™ product.

A double gantry system is disclosed by Freund in U.S. Pat. No. 5,692,878. Freund discloses a disk handling system that separates disks from a stack of disks. The Freund system is a double-gantry system. The double gantry system includes a lifting means, tapered shaft, a spring arm and a gripper.

The tapered shaft inserts centrally within a stack of disks. The spring arm is fixed relatively above the stack. The lifting means vertically lifts the stack against the spring arm. The spring arm offsets the uppermost disk from top of the stack. The gripper grasps the edge of the offset disk by its edge to move the disk from the top of the stack.

Gantries do not always handle disks with perfect reliability. One reason for this is that gantries typically have a large number of moving parts. These parts must be coordinated. Lack of coordination can cause disks to jam. The probability of wear and malfunction typically also increases with each moving part. What is desired is a simple system that reliably dispenses and prints disks. What is also desired is a system that consumes a minimum amount of space.

SUMMARY OF THE INVENTION

A disk dispenser in combination with a printer dispenses disks from the bottom of a stack of disks to the printer. The printer includes a sliding tray for receiving disks. The disk dispenser is positioned relative to the sliding tray to dispense disks on to the tray. The sliding tray extends and retracts, while the tray retracts the printer prints indicia such as a logo, a color image and text on the surface of the disk.

The disk dispenser includes an upper guide, a lower guide and a plate slidably mounted between the upper guide and the lower guide. The upper guide and lower guide define an opening. The plate slides to dispense disks through the lower guide opening. The opening of the upper guide is axially offset from the opening of the lower guide.

The lower guide attaches to the upper guide and includes a rim for supporting a disk. The plate has an arced edge for sliding disks between a first position where the lower guide rim supports the disk to a second position where the plate pushes the disk from the rim and thereby dispenses the disk through the opening in the lower guide. The arced edge of the plate defines an inner periphery, which surrounds and circumscribes a disk.

The rim of the lower guide includes a support lip and an edge opposing the support lip. The support lip mounts on the inner periphery and extends into the opening. The opposing edge cooperates with the support lip to support a disk in the lower guide. When the lower guide supports a disk, and the plate moves from the first position to the second position, the plate pushes the disk off of the edge of the lower guide to dispense the disk.

The present invention is particularly useful when mounted on a turntable as part of a system for duplicating and printing on disks.

DETAILED DESCRIPTION

Figure 1:
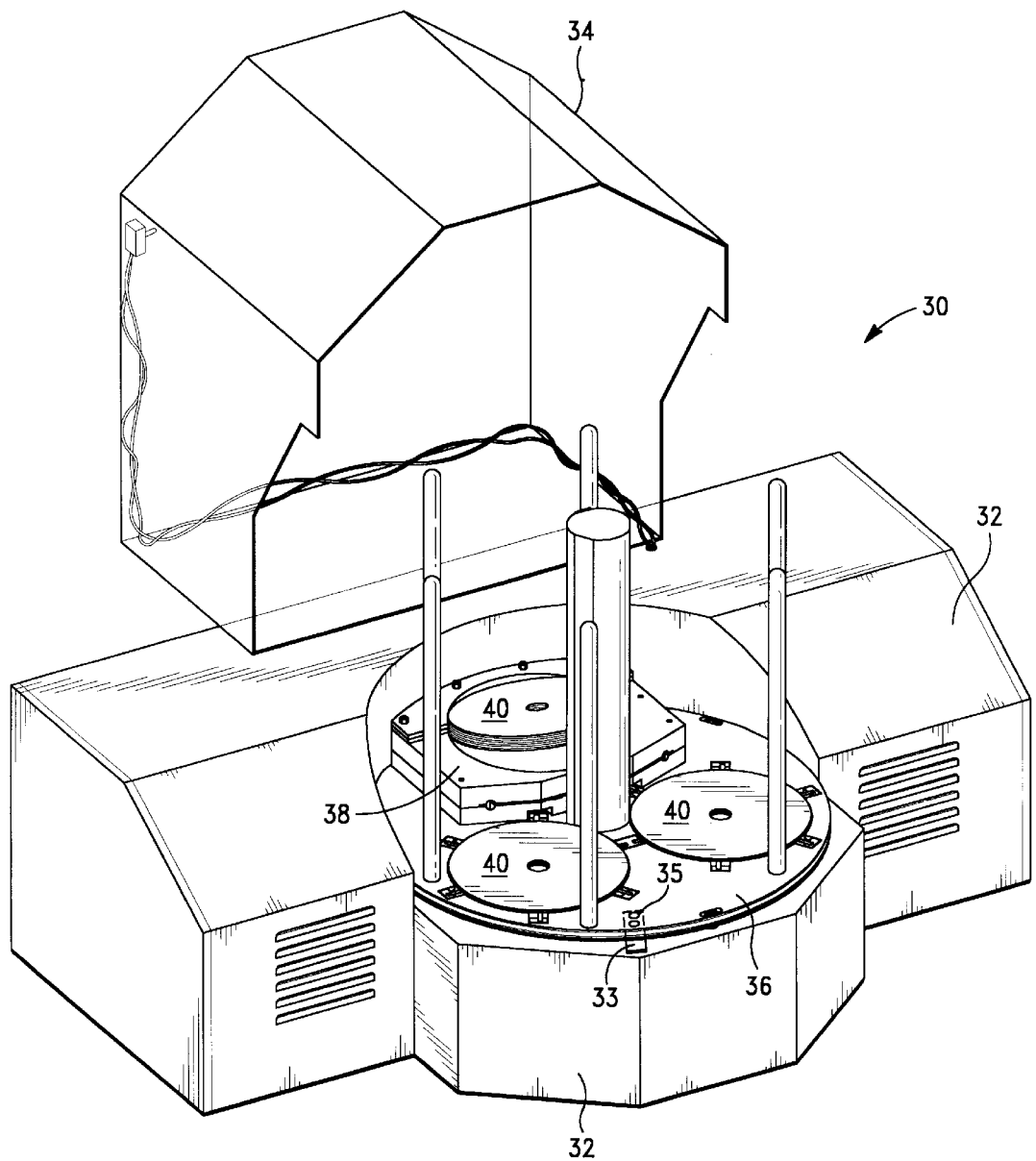
FIG. 1 is perspective view of a disk duplication system in accordance with the present invention.

FIG. 1 shows a disk duplicator system, generally designated with the reference numeral 30. The system 30 includes a housing 32 with a cover 34, a turntable 36, and a disk dispenser 38. The turntable 36 includes several hoppers for feeding and accepting disks 40. The turntable 36 rotates to move the disks 40 along an arcuate path. The system 30 includes a sensor 33 mounted on a portion of the housing 32, adjacent the turntable 36.

The disk dispenser 38 dispenses disks 40 into the housing 32. The housing 32 encloses a recorder to write data on the dispensed disks. The turntable 36 rotates to accept the data written disk in a selected hopper for temporary storage. Rotation of the turntable enables the disk dispenser 38 to dispense another disk into the housing 32, and the process of writing data to repeat.

The turntable 36 includes embedded magnets 35. The sensor 33 detects the magnets 35 to enable the system to recognize when the turntable 36 is in a desired rotational position with respect to the housing 32.

The disk dispenser 38 of the present invention is useful in conjunction duplicating data on memory storage disks 40. It can be appreciated, however, that a variety of media including optical or magnetic memory storage media may be dispensed and duplicated in accordance with the present invention.

Figure 2:
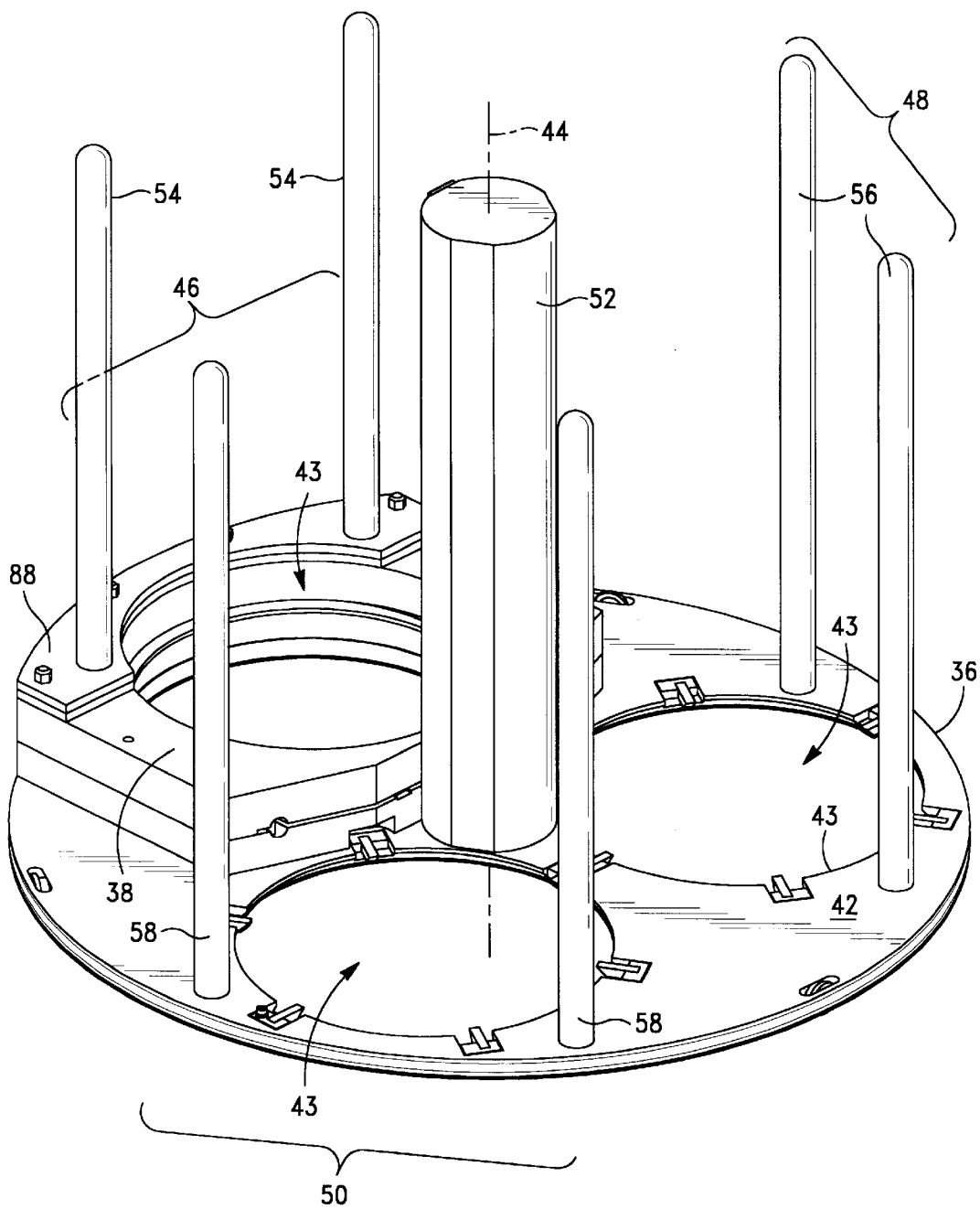
FIG. 2 is a perspective view of the turntable of FIG. 1.

FIG. 2 shows the turntable 36. The turntable 36 includes a central post 52, outer posts 54, 56 and 58, a surface 42 defining three openings 43. The turntable has an axis 44, a generally designated feed hopper 46, accept hopper 48, and reject hopper 50. The hoppers 46, 48 and 50 generally align adjacent a respective opening 43 to dispense or accept disks through each respective opening.

The disk dispenser 38 mounts on the turntable 36 adjacent one respective opening 43 to dispense disks through the turntable 36. The outer posts 54 cooperate with the central post 52 to define the hopper 46 which guides disks into the disk dispenser 38.

Figure 3:
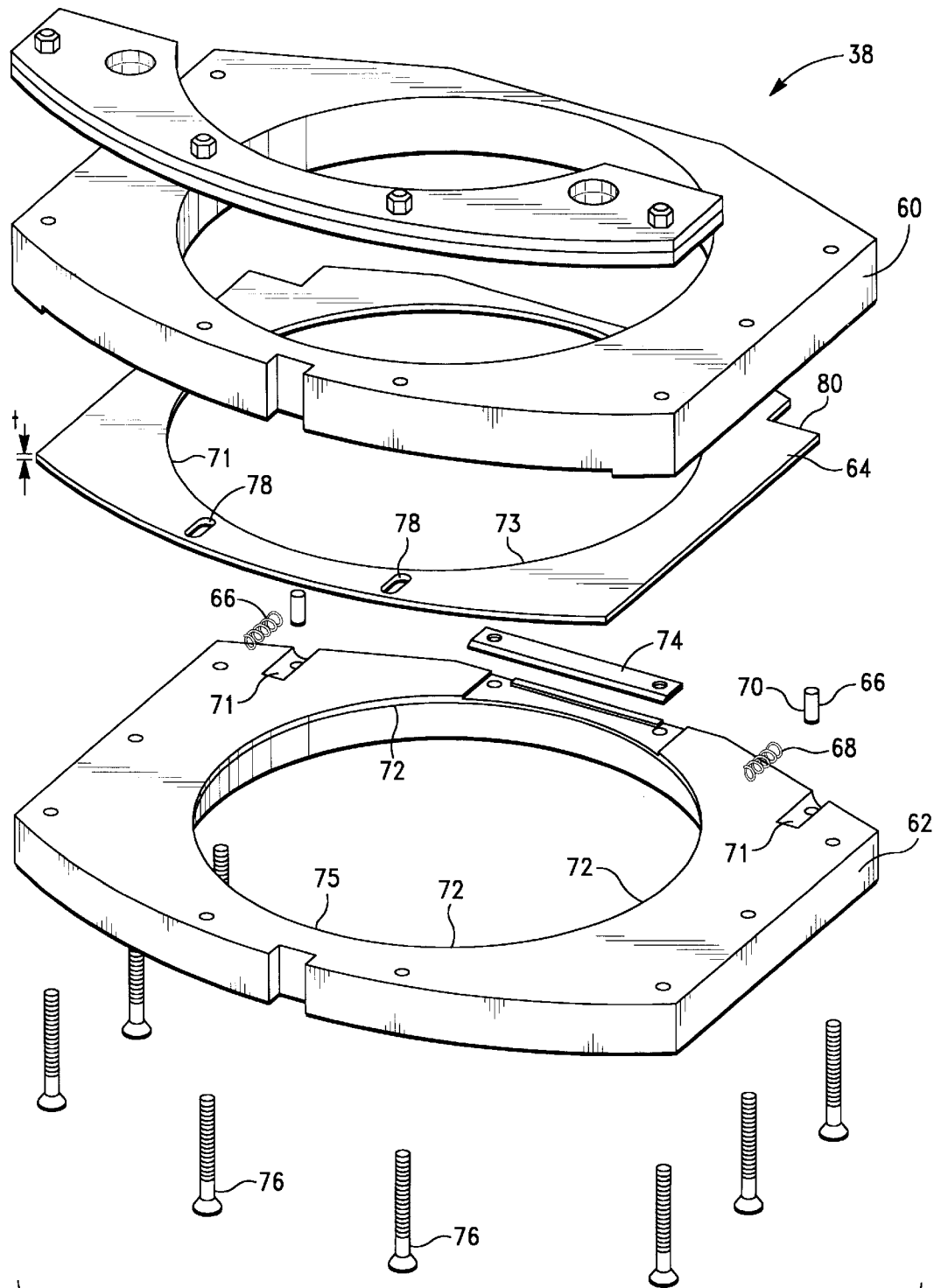
FIG. 3 is an exploded perspective view of the disk dispenser of FIG. 1.

The central post 52 aligns with the turntable axis 44. The outer posts 54, 56 and 58 are positioned co-radially with respect to the turntable axis 44. The outer posts 56 and 58 cooperate with the central post 52 to surround the respective turntable openings 43 and to define the reject hopper 48 and accept hopper 50, respectively. Although outer posts 54, 56 and 58 cooperate with the central post 52 to define the hoppers 46, 48 and 50 and provide a light weight structure to guide disks, one can appreciate that hoppers may assume any of a number of configurations. A cylindrical wall may define a hopper, for example. Also for example, a helical coil, or by another structure having a lightweight design could dene the hopper FIG. 3 shows an exploded view of the disk dispenser, generally designated 38. The disk dispenser 38 includes an upper guide 60, a lower guide 62 and a plate 64. The lower guide 62 includes a spring 68, a rim 72, a support lip 74, an opposing edge 75, and fasteners 76. The plate 64 includes an arced edge 71. The arced edge 71 defines an inner periphery 73. The inner periphery 73 defines an opening for surrounding a disk. Preferably, the inner periphery 73 is circular for circumscribing a disk. The inner periphery 73 is configured with a beveled edge for separating single disks from a stack of disks.

The upper guide 60, the lower guide 62 and the plate 64 each define a generally circular opening to enable a disk to pass through the disk dispenser 38. Each opening is sized for a disk to pass through when the disk parallels the plate 64. The upper guide 60 and the lower guide 62 are axially offset from each other so that a portion of the rim 72 of lower guide 62 stops disks which may fall thorough the upper guide 60 towards the lower guide 62. The opposing edge 75 diametrically opposes the support lip 74. The support lip 74 cooperates with the opposing edge 75 to hold a disk on the lower guide 62. The plate 64 slidably mounts between the upper guide 60 and the lower guide 62 to selectively pass disks stopped by the lower guide 40 through the lower guide 62.

The pin 70 extends between the lower guide 62 and the upper guide 60 to retain the spring 68. The plate 64 includes a pair of holes 78, which align with respective fasteners 76. The fasteners 76 extend through the upper guide 60, the plate 64 and the lower guide 62 to hold the upper guide 60 and the lower guide 62 together. The fasteners 76 retain the plate 64 between the upper guide 60 and the lower guide 62. The fasteners 76 align the plate 64 relative to the upper guide 60 and the lower guide 62 when the plate 64 slides.

The lower guide 62 includes a groove 71. The spring 68 is a coil spring having two ends. The spring 68 lies in the groove 71. The pin 70 inserts perpendicularly into the groove 71. Accordingly, one end of the spring 68 contacts the pin 70. The spring 68 biases the plate 64 in a desireo position. According to one aspect of the invention, the spring 68 offsets the plate 64 from the lower guide 62 to enable the lower guide 62 to support a disk.

The plate 64 has a shoulder with an edge 80. The edge 80 contacts the other end of the spring 68. The spring 68 biases the plate 64 into a desired position relative to the lower guide 62. When the plate 64 slides towards the pin 70, the spring 68 dampens movement of the plate 64. The plate 64 has a generally uniform thickness "t". The thickness "t" approximates the thickness of an individual disk to be dispensed so that when the plate 64 slides, only one disk is dispensed.

Figure 4:
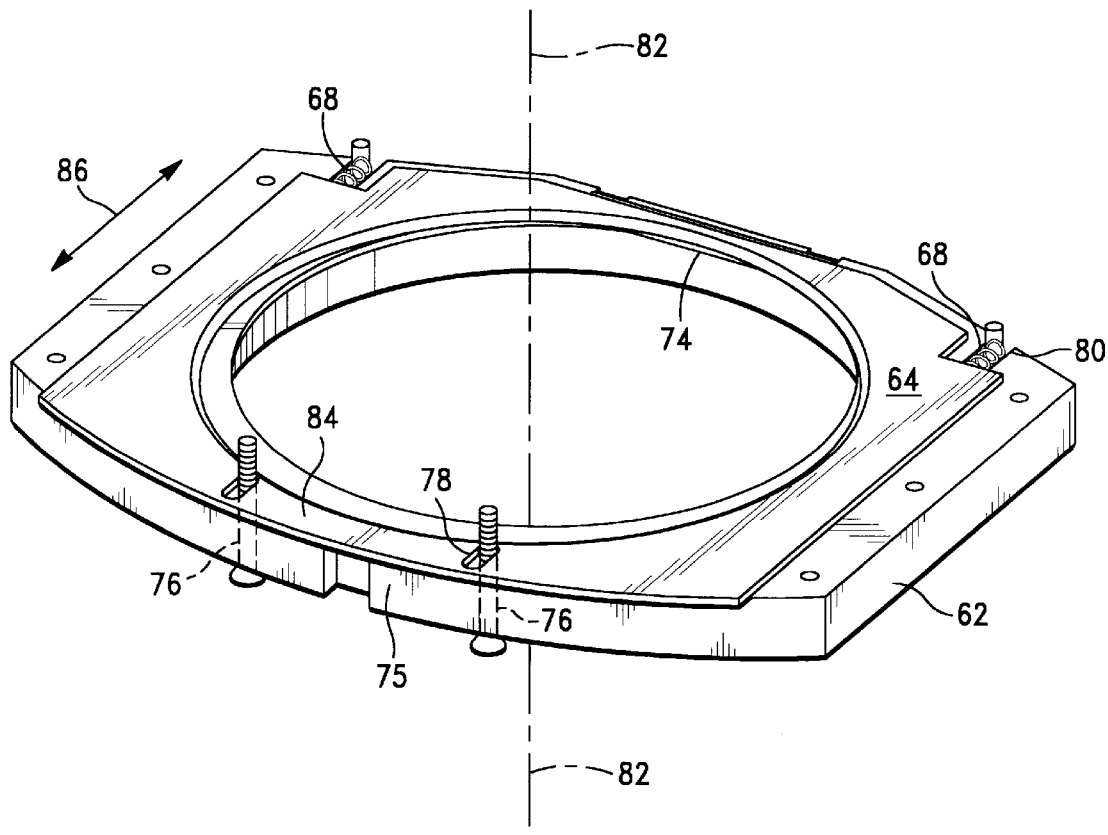
FIG. 4 is a perspective view of a portion of the dispenser of FIG. 3.

FIG. 4 is a perspective view of the plate 64 and the lower guide 62. The plate 64 reciprocates with respect to the lower guide in the directions of the arrows 86. The lower guide 62 opening defines an axis 82. The spring 68 biases the plate 64 so that the plate opening is axially offset from the lower guide opening. Offsetting the plate 64 opening from the lower guide 62 opening enables the support lip 74, in cooperation with the opposing edge 75, to hold a disk on the lower guide 62. The plate 64 circumscribes a disk when the disk is on the lower guide 62. The plate 64 slides towards the springs 68 to dispense a disk through the lower guide 62 opening. The springs 68 reciprocate the plate 64.

Figure 5:
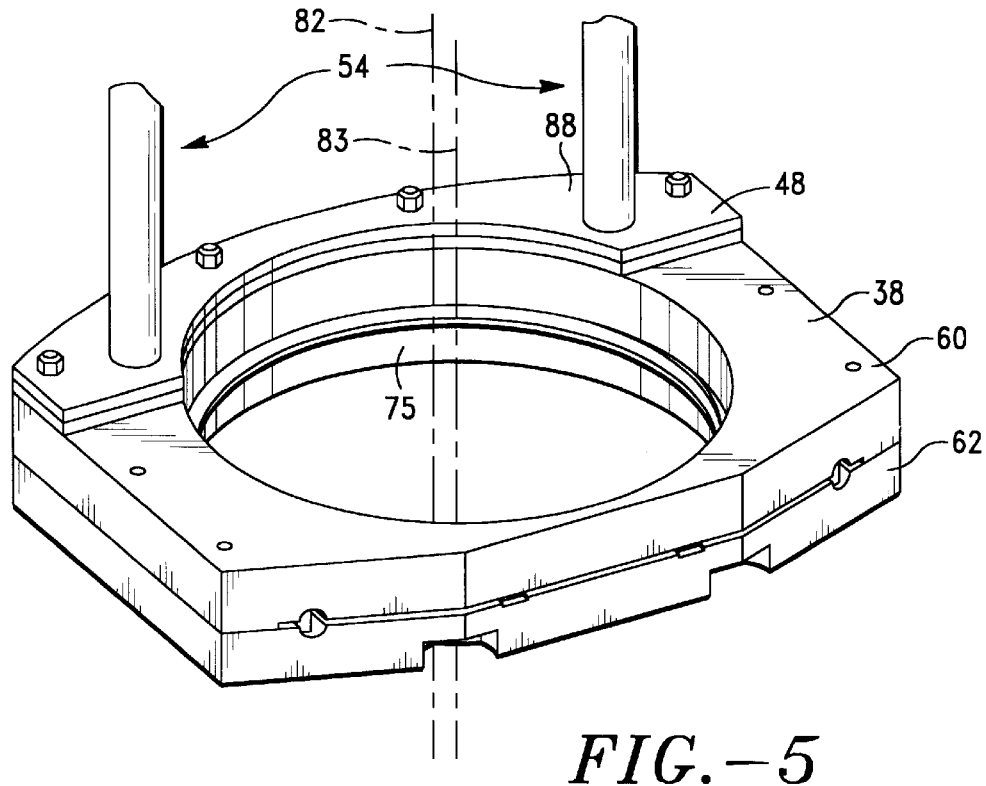
FIG. 5 is a perspective view of the disk dispenser of FIG. 3 and a portion of a feed hopper.

FIG. 5 is a perspective view of the disk dispenser 38 attached to the feed hopper 46. The feed hopper 46 is configured with a reinforcement plate 88, which bolts to the upper guide 60. The outer posts 54 mount on the reinforcement plate 88. Accordingly, the feed hopper attaches to the disk dispenser. The reinforcement plate 88 inhibits flexion of the disk dispenser 38 while supporting the feed hopper 46 (see FIG. 2).

The upper guide 60 has an opening with an axis 83. The axis 82 of the lower guide 62 opening is axially offset from the axis 83 of the upper guide 60 opening.

Figure 6:
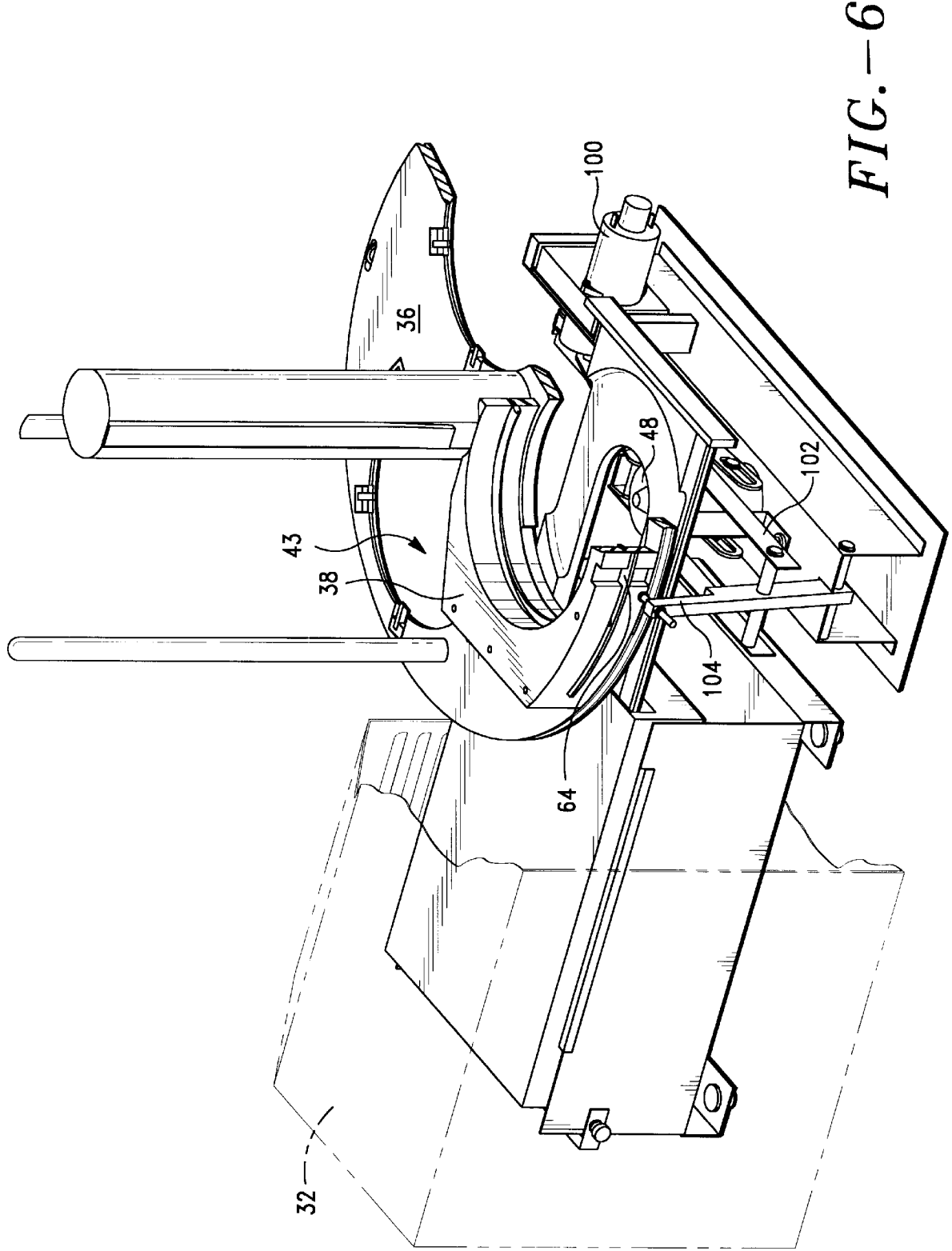
FIG. 6 shows a cutaway rear perspective view of the system of FIG. 1.

FIG. 6 shows a cutaway rear perspective view of the housing 32. The housing 32 includes a motor 100, a mechanical linkage 102, the elevator pin 98 and an arm 104. The arm 104 and the elevator pin 98 are connected via the mechanical linkage 102 to the motor 100. The motor 100 actuates the mechanical linkage 102 to cause the arm 104 to slide the plate 64 and to lift and lower the elevator pin 98.

Movement of the linkage 102 and rotation of the turntable 36 dispense disks, one at a time, from the dispenser 38 onto the elevator pin 98. Movement of the linkage 102 may also insert disks, one at a time, through the opening 43 in the turntable 36 when the turntable 36 rotates.

Figure 7:
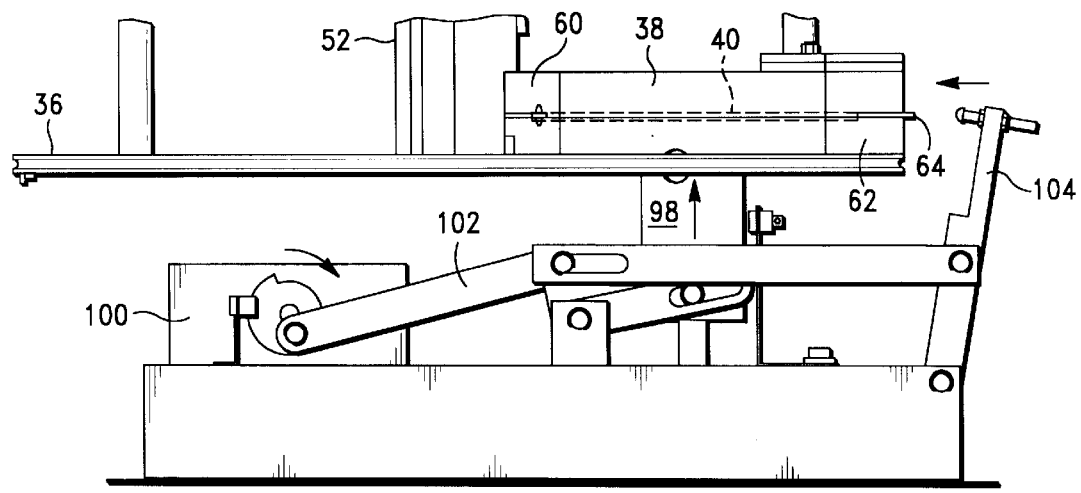
FIG. 7, FIG. 8, and FIG. 9 are side views, in sequence, of the elevator pin moving a disk from the turntable of FIG. 1.

FIG. 7 shows a side view of the disk dispenser 38, the turntable 36 and the linkage 102. The motor 100 actuates the linkage 102. The linkage 102 elevates the elevator pin 98 towards the turntable 36 and moves the arm 104. The arm 104 moves towards the plate 64 of the disk dispenser.

Figure 8:
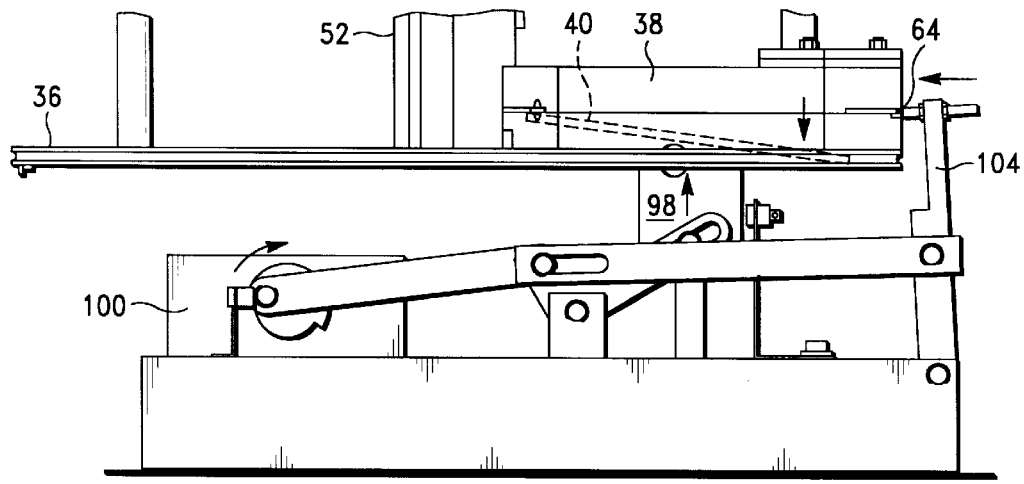

FIG. 8 shows further movement of the linkage 102. The arm 104 presses against the plate 64 to slide the plate 64. Sliding the plate 64 relative to the upper guide 60 and the lower 62 guide causes the dispenser 38 to drop the disk 40 onto the elevator pin 98.

Figure 9:
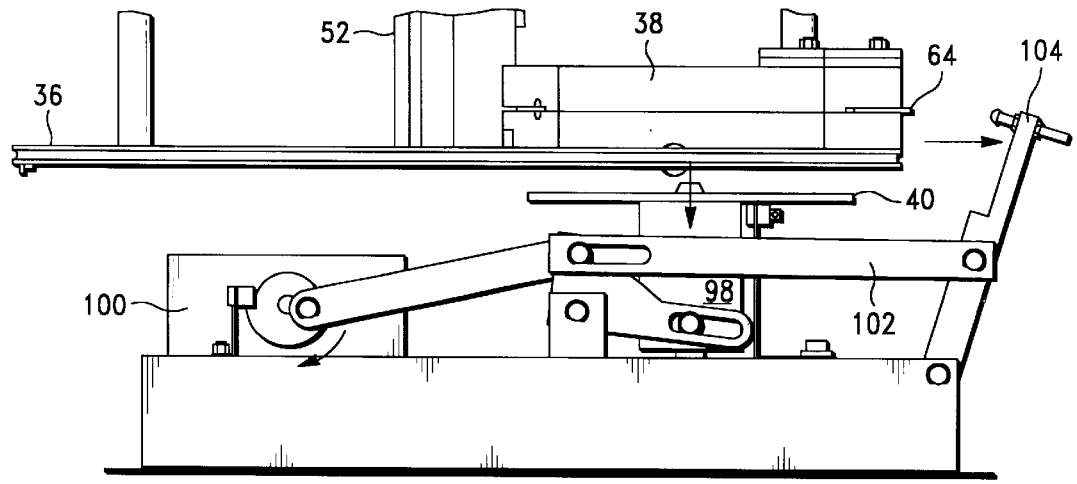

FIG. 9 shows further movement the linkage 102. The elevator pin 98 retracts from the dispenser 38. The arm 104 simultaneously withdraws from the dispenser 38. The elevator pin 98 lowers the dispensed disk 40 away from the dispenser 38.

A single elevator pin cycle is completed when the elevator pin 98 retracts and the arm 104 withdraws. At this point in the cycle, the turntable 36 rotates. Rotation of the turntable 36 enables a subsequent cycle of the elevator pin 98 to lift the disk 40 back onto the turntable 36, for example.

Figure 10:
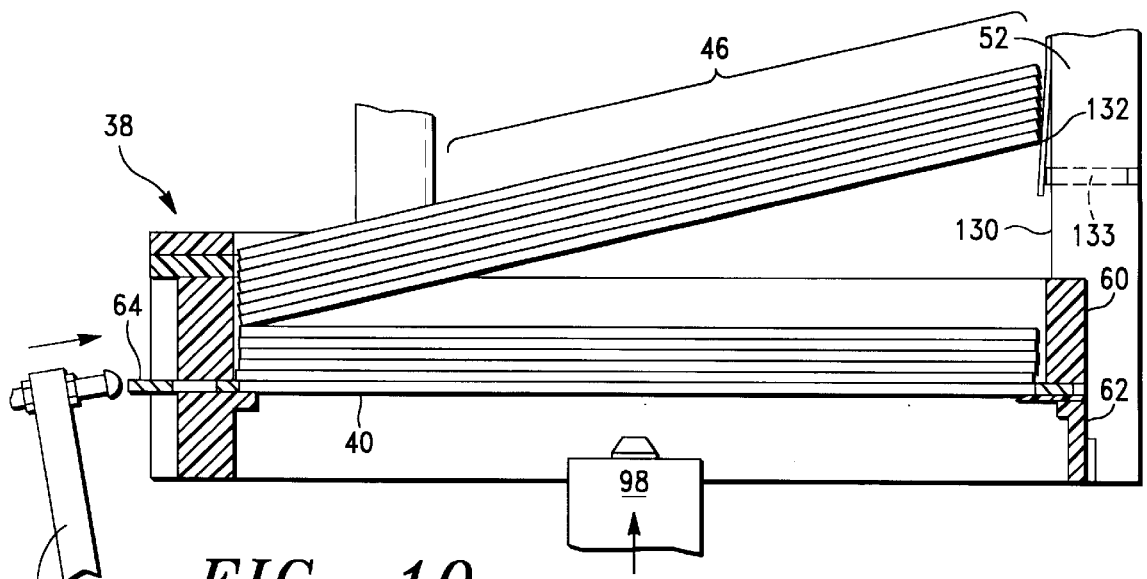
FIG. 10, FIG. 11 and FIG. 12 correspond with FIG. 7, FIG. 8 and FIG. 9, respectively, and show partial cross-sectional views of the disk dispenser from a reversed angle.

FIG. 10 shows the arm 104 moving towards the plate 64. The support lip 74 and the opposing edge 75 of the lower guide 62 support the disk 40. The elevator pin 98 moves towards the dispenser 38 and the arm 104 moves towards the plate 64. Preferably, the upper guide 60 holds from 4–6 disks in parallel with the plate. The three hoppers are each adapted to hold between 100–150 disks.

The central post 52 of the feed hopper 46 includes a recessed portion 130, an extended portion 132 and an adjustable set screw 133. The recessed portion 130 is adjacent the upper guide 60 to feed disks, in horizontal alignment with the plate 64, from the feed hopper 46 to the upper guide 60. The set screw 133 rotatably extends through the central post 52 to adjust the distance at which the extended portion 132 extends from the central post 52 and insures proper feeding of disks from the feed hopper 46 to the upper guide 60.

The extended portion 132 angles disks stacked in the feed hopper 46 with respect to the plate 64. Angling disks within the feed hopper 46 minimizes forces caused by disk weight on the disk dispenser 38, and particularly on the plate 64. Minimizing such forces enables multiple disks to be stacked in the feed hopper 46 and optimizes reliability of the disk dispenser.

Figure 11:
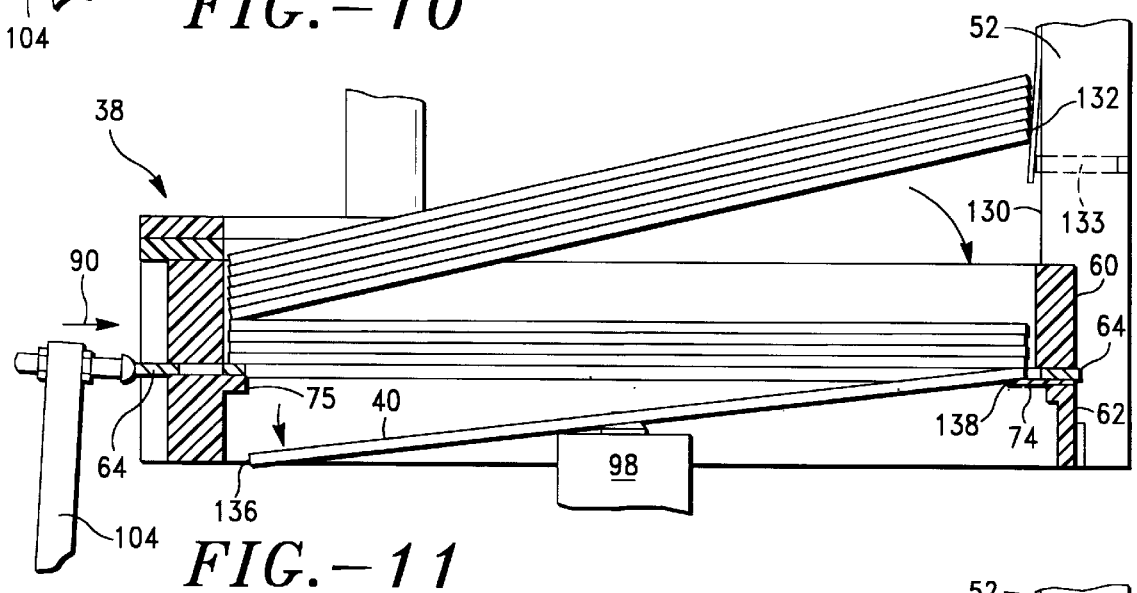

FIG. 11 shows the arm 104 contacting the plate 64. The disk 40 has two opposing edges 136 and 138. The arm 104 contacts the plate 64 to slide the plate 64 in the direction of the arrow 90. The plate 64 urges the edge 136 of the disk 40 off of the edge 75 of the lower guide 62. Reciprocation of the plate 64 urges the other edge 138 of the disk 40 off of the support lip 74 so that the disk 40 falls from the lower guide 60 onto the elevator pin 98.

Figure 12:
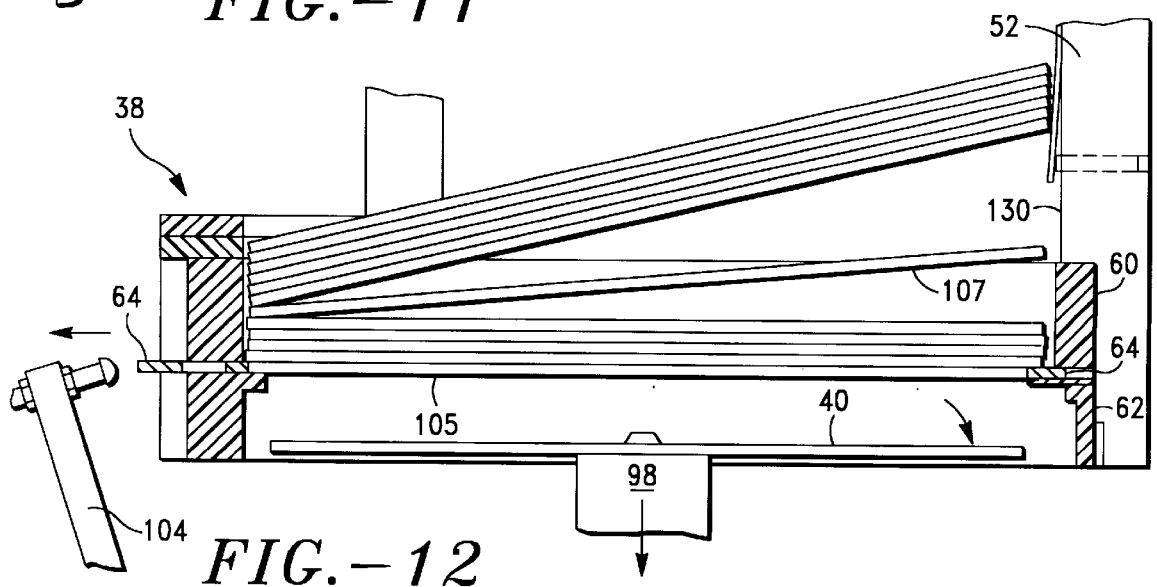

FIG. 12 shows the arm 104 withdrawn from the plate 64. The plate 64 automatically reciprocates as the arm 104 withdraws. The plate 64 guides the next disk 105 onto the lower guide 62. Movement of the next disk 105 onto the lower guide 62 causes another disk 107 to fall from the hopper into the upper guide 60.

Figure 13:
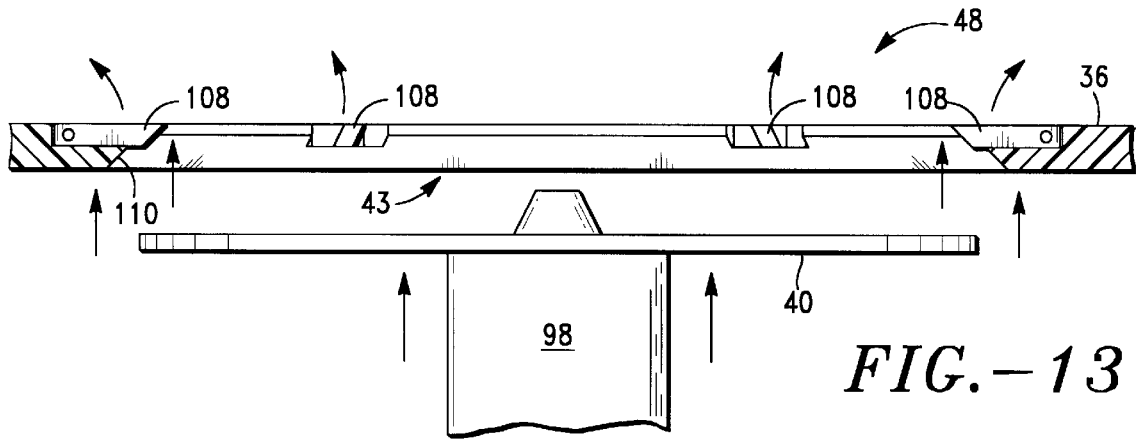
FIG. 13, FIG. 14 and FIG. 15 show a cross-sectional side view of the elevator pin lifting a disk.

FIG. 13 shows the elevator pin 98 extending to lift the disk 40 towards the turntable 36 from below the opening 43 of the accept hopper 48. The turntable defines the opening 43 to enables disks to pass into the accept hopper from beneath the turntable 36. The turntable 43 includes a periphery 110 surrounding the opening 43. A plurality of disk clips 108 mount on the periphery 110. The disk clips 108 function to allow the disk 40 to move through the turntable 36 into the accept hopper in only one direction, in the direction of the arrow 106.

Figure 14:
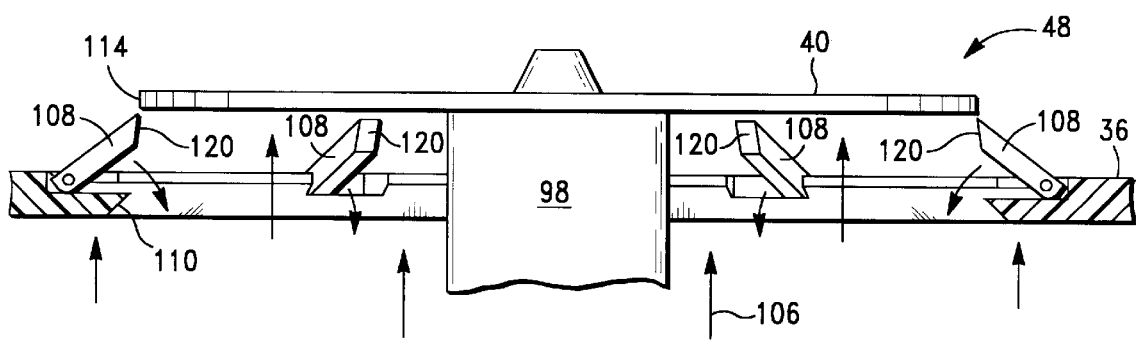

FIG. 14 shows the elevator pin 98 lift the disk 40 in the direction of the arrows 106 above the turntable 36. The elevator pin 98 passes through the turntable 36 with the disk 40. The disk 40 lifts the disk clips 108 as the disk 40 passes through the turntable 36. The disk 40 has an outer edge 114. The disk clips have ends 120. As the elevator pin 98 passes through the turntable, the outer edge 114 of the disk contacts the ends 120 of the disk clips 108.

The ends 120 of the disk clips 108 are angled to contact primarily the outer edge 114 of the disk 40. The angled ends 120 align the disk 40 in parallel with the turntable 36 as the disk passes through the turntable 36. This alignment insures that the disk 40 will not flutter on the elevator pin 98 when the elevator pin 98 extends to lift the disk 40 through the turntable 36. The elevator pin 98 retracts to place the disk 40 on to the disk clips 108.

Figure 15:
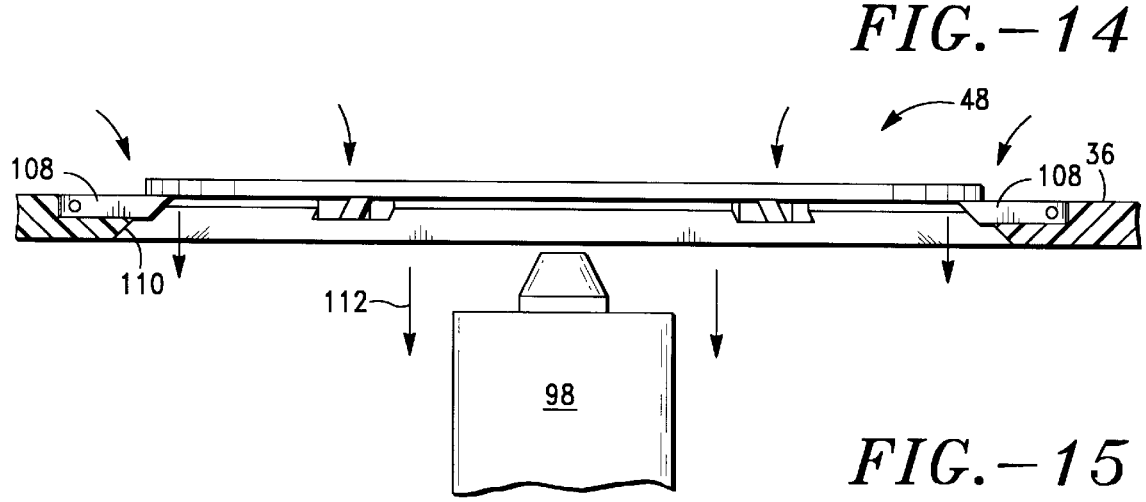

FIG. 15 shows the elevator pin 98 reciprocating in the direction of the arrows 112. The disk clips 108 extend radially towards the center of the opening 110. The elevator pin drops the disk 40 on the disk clips 108 so that the disk clips support the outer edge 114 of the disk 40. The disk clips 108 align with the turntable 36 to support the disk 40 on the turntable 36. The disk clips 108 are configured, having strength enough to support a stack of disks.

Repeating the process shown in FIG. 13, FIG. 14 and FIG. 15 that elevator pin stacks multiple disks on the disk clips 108 via the turntable opening 110 from beneath the turntable 36. To enable the disk clips 108 support a stack of disks, the elevator pin 98 is strong enough to lift the stack of disks supported when the elevator pin 98 lifts a disk through the turntable 36.

Figure 16:
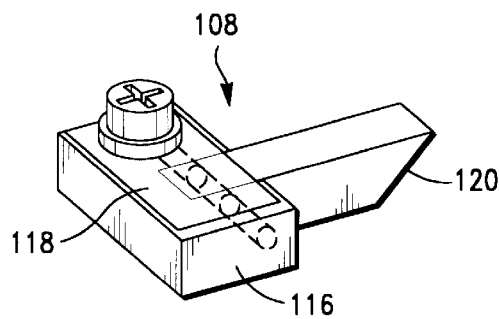
FIG. 16 and FIG. 17 show a disk clip in accordance with FIG. 15 and FIG. 14, respectively.

FIG. 16 shows a disk clip 108. The disk clip 108 includes a hinge 116, a spring 118 and the angled end 120. The spring 118 includes a strip of resilient material, which covers a portion of the disk clip 108 to bias the disk clip 108 in the configuration shown.

Figure 17:
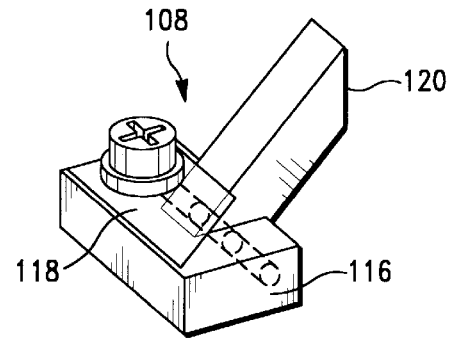

FIG. 17 shows the disk clip 108 rotated about the hinge 116. The disk clip 108 extends at an angle with respect to the hinge 116. The spring 118 flexes and the beveled edge 120 aligns perpendicularly to the hinge 116 and to the turntable surface, see FIG. 13.

Figure 18:
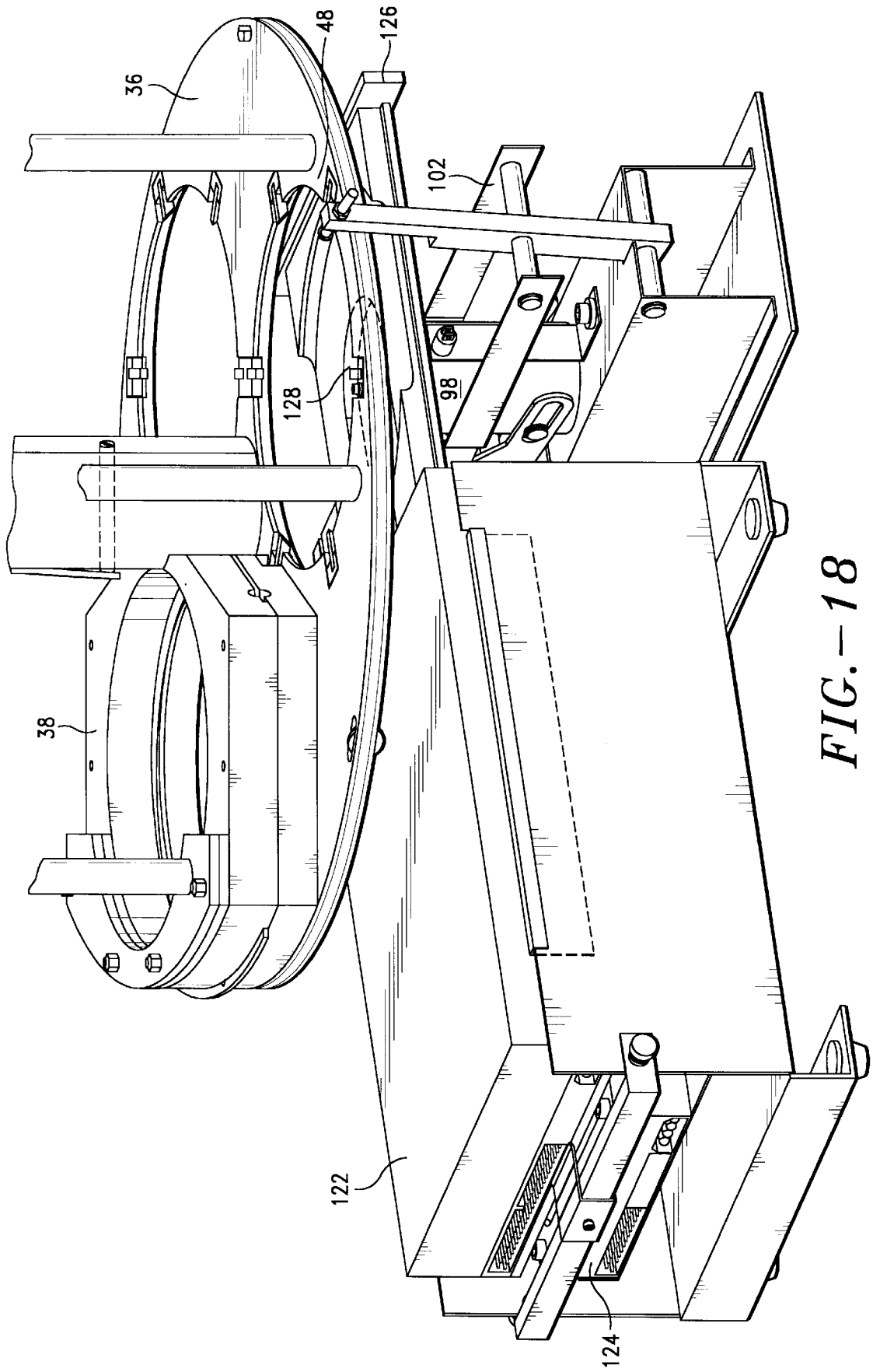
FIG. 18 is a perspective view of a disk recorder positioned in an operative arrangement with respect to the turntable and linkage mechanism in accordance with the present invention

FIG. 18 shows the turntable 36, a recorder 122, a hard drive 124, the elevator pin 98, and the mechanical linkage 102. The recorder 122 includes a tray 126. The tray 126 automatically extends from the recorder 122 to interpose a disk between the elevator pin 98 and the turntable 36, or to catch a disk, which is dispensed from the disk dispenser 38.

The tray 126 includes an opening 128 to enable the elevator pin 98 to extend through the turntable 36, via the tray 126. The hard drive 124 couples with the recorder 122 to deliver data to be written. A controller including a circuit board within the housing regulates operation of the hard drive 124, the recorder 122, the linkage 102 and the turntable 36.

According to one aspect of the invention, the recorder 122 is a CD-R or Compact Disk Recorder. Preferably, the housing 32 of FIG. 1 encloses the recorder 122, the hard drive 124, the pin 98 and the linkage 102. The recorder 122 in combination with the disk dispenser 38, turntable 36 and the elevator pin 98 enables duplication of recordable CD's.

Figure 19:
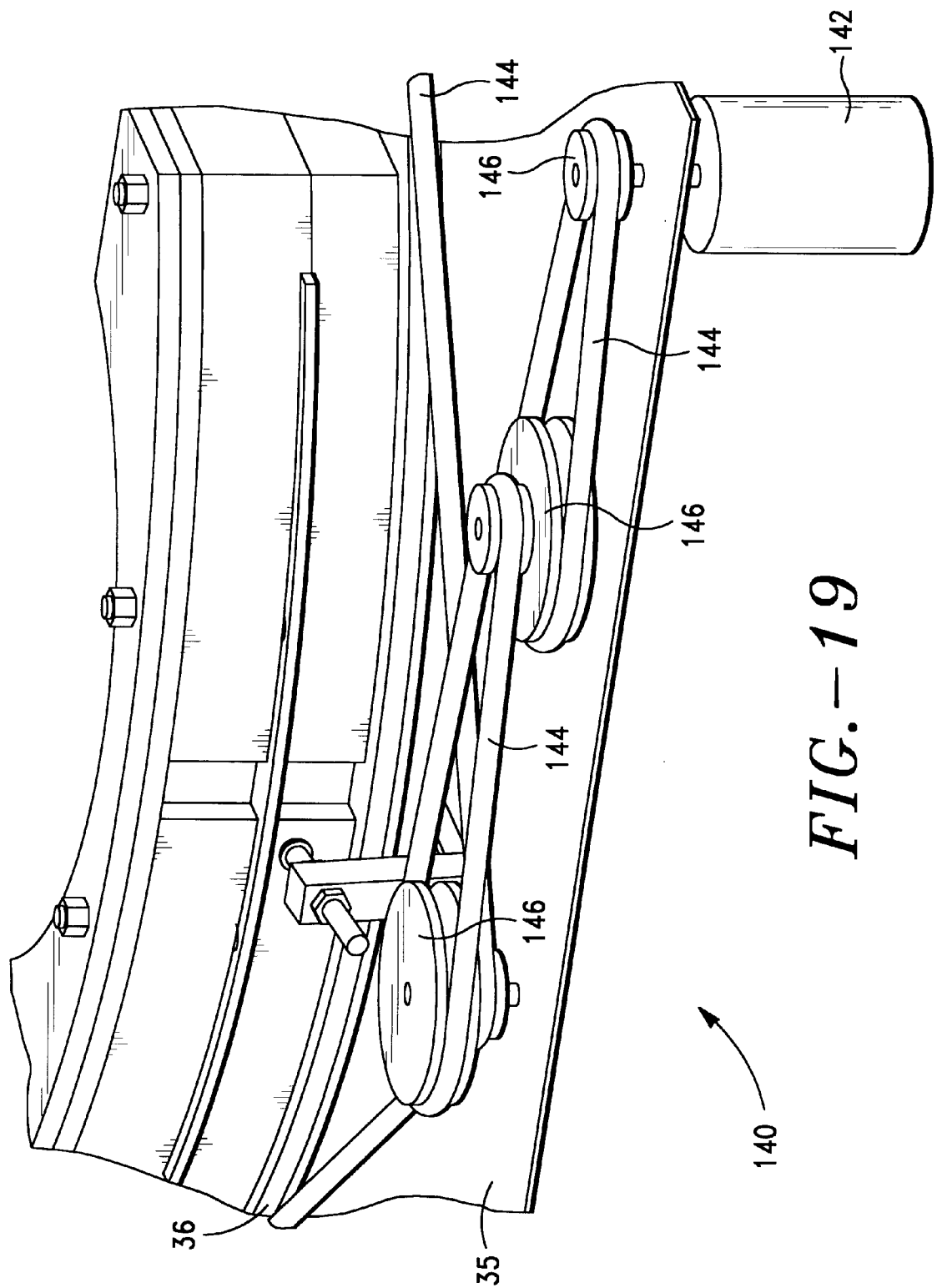
FIG. 19 is a perspective view of the drive linkage for the turntable of FIG. 1.

FIG. 19 is a perspective view of a portion of the linkage assembly, generally designated 140, which rotates the turntable 36 in accordance with the present invention. The drive linkage assembly 140 mounts on a portion of the housing 32. The assembly 140 includes a motor 142, belts 144, and pulleys 146. The belts 144 and pulleys 146 operate to selectively rotate the turntable 36 at a desired rate.

Figure 20:
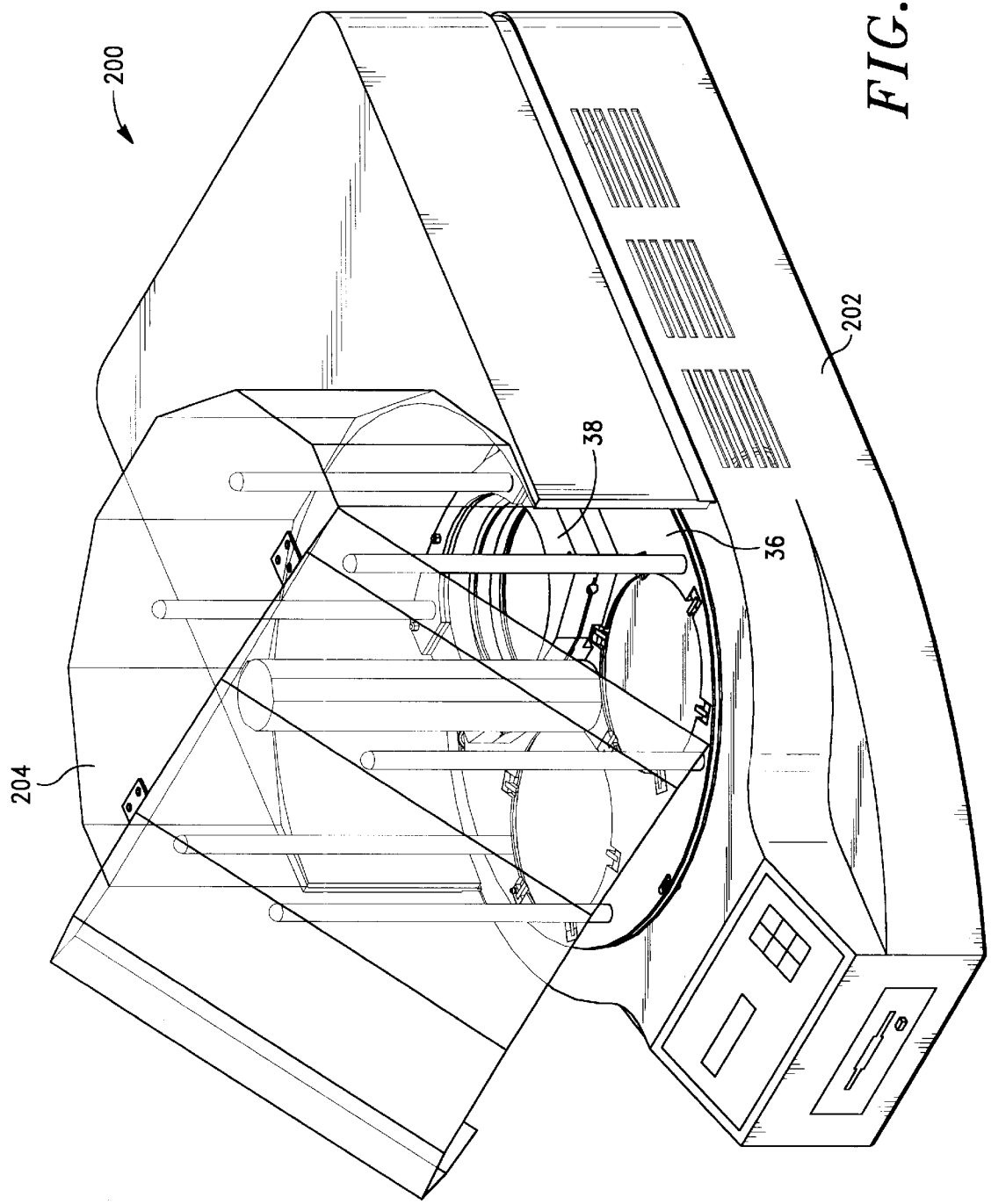
FIG. 20 is a perspective view of a disk writer in combination with a disk printer.

FIG. 20 shows a disk duplicating and printing apparatus 200. The apparatus 200 includes a housing 202, which encloses a disk recorder and disk printer. The apparatus 200 includes a turntable 36 having a disk dispenser 38, and a transparent cover 204.

The transparent cover 204 is split and includes hinges 206 to enable the cover 204 to open and close without requiring removal of the cover from the housing. The cover 204 is transparent to enable inspection of the disk duplicating and printing apparatus 200 during operation.

While the turntable and disk dispenser are shown in conjunction with a recorder and a printer, it can be appreciated that the turntable and dispenser can be used in any of a number of operations which are performed on memory storage disks, including cleaning, polishing, re-recording, reading, etc.

Figure 21:
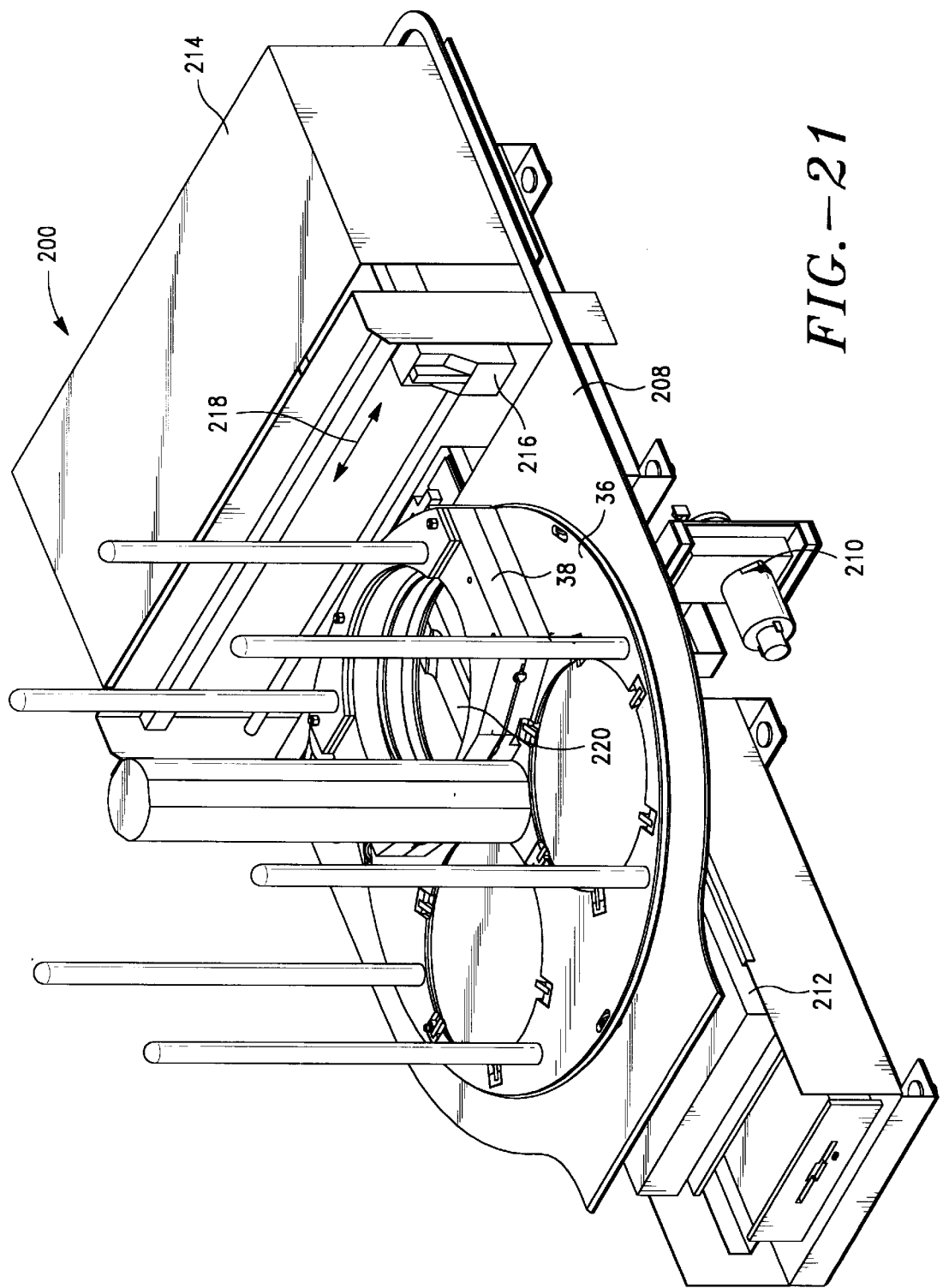
FIG. 21 is a perspective view of the combination of FIG. 20 without a cover.

FIG. 21 shows the apparatus 200 having a frame 208, a motor 210, a disk recorder 212 and a disk printer 214. The disk recorder 212, disk printer 214 and motor 210 mount on the frame 208. The motor 210 rotates the turntable 36 to move disks between the turntable 36, the disk writer 212 and the disk printer 214. The motor 210 also actuates the disk dispenser 38.

The printer 214 has a tray 220, which extends and retracts. The printer 214 includes an ink jet cartridge 216 which reciprocates in the direction of the arrows 218 to enable the printer 214 to write on disk surfaces. According to one aspect of the invention, the printer 218 is a SIGNATURE® printer and the ink jet cartridge 216 reciprocates across a disk to print on the disk surface as the tray 220 extends.

Figure 22:
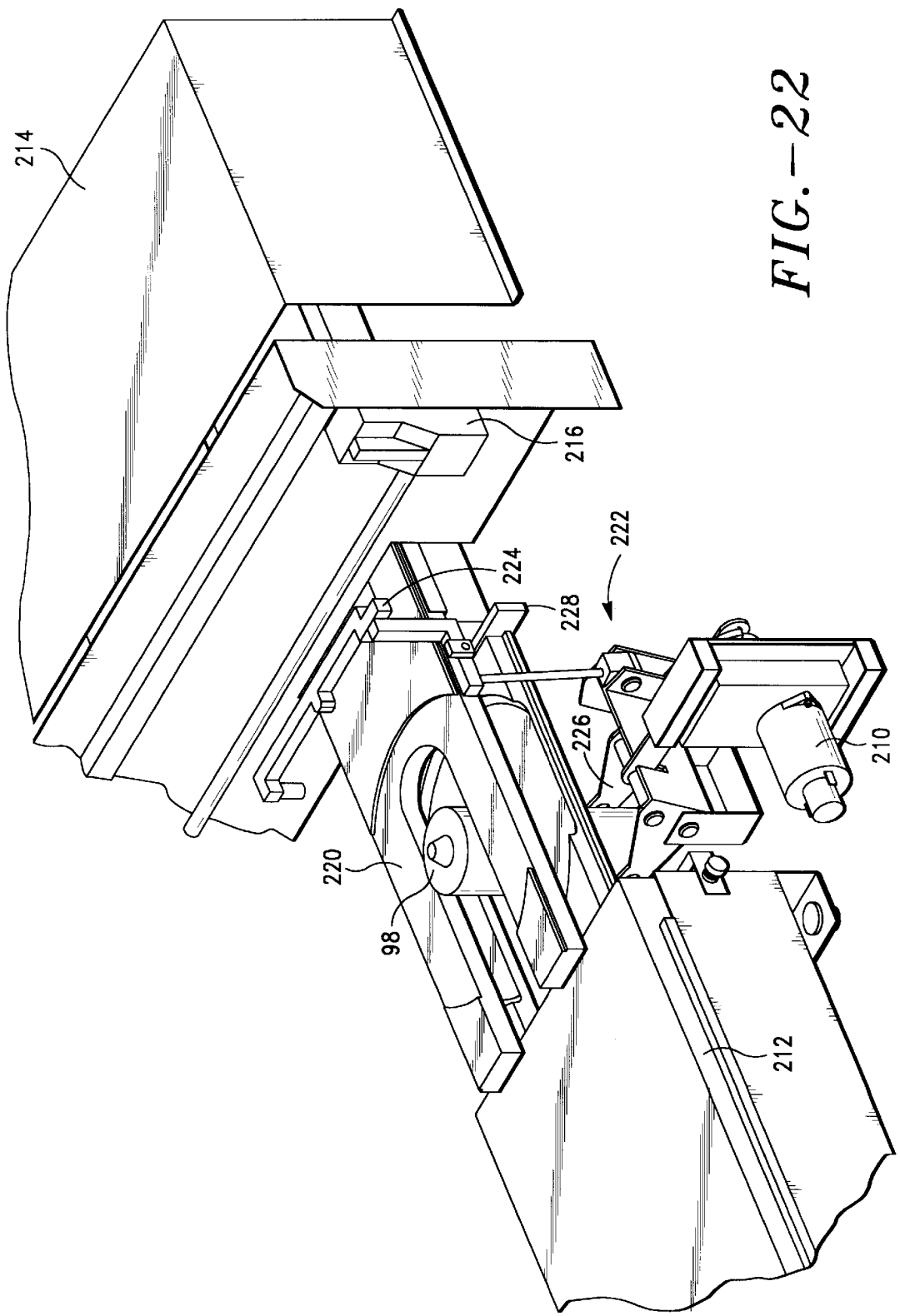
FIG. 22 is a perspective view of the writer tray, the printer tray and the elevator pin in accordance with the invention of FIG. 20.

FIG. 22 shows the printer 214, the recorder 212, the motor 210 and an elevator pin linkage 222. The elevator pin linkage assembly 222. The elevator pin linkage assembly 222 includes a disk dispenser actuator 224 and an elevator pin actuator 226. Accordingly, the elevator pin linkage assembly 222 coordinates the elevator pin 98 and the disk dispenser actuator 224.

The elevator pin 98 extends and retracts. The recorder 212 includes a tray 228. The tray 228 includes a central opening to allow the elevator pin to extend through. A portion of the tray 220 is bifurcated to form a U shaped opening. Bifurcation of at least a portion the tray 220 enables the tray 220 to extend and retract when the elevator pin 98 extends. Accordingly, the tray 220 can extend or retract independently of the relative position of the elevator pin 98.

The tray 220 of the printer 214 and the tray 228 of the recorder 212 oppose each other. This is not the only possible configuration. Conceivably, the recorder trays and printer trays can radially align, or stack above an appropriately configured elevator pin in accordance with the present invention.

Figure 23:
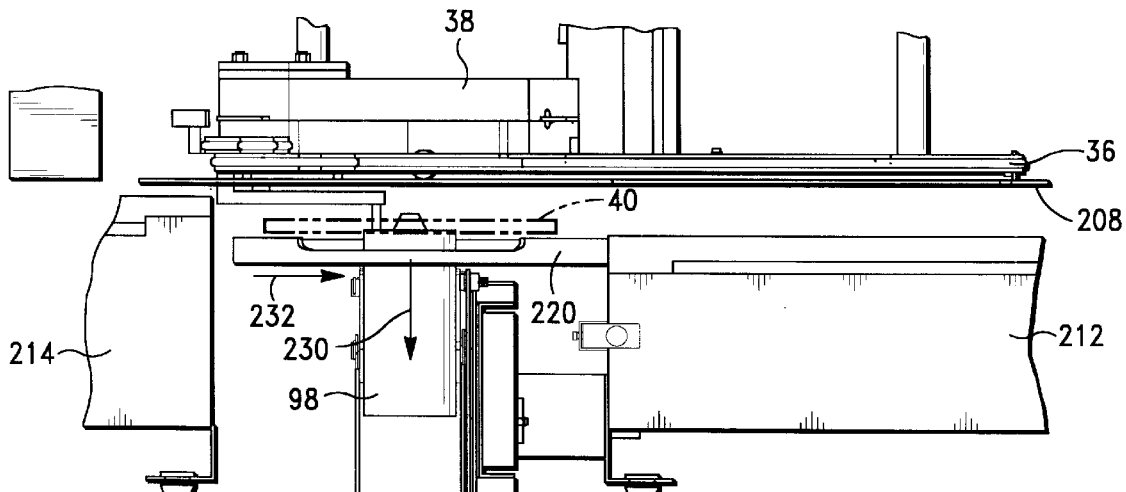
FIG. 23, FIG. 24, FIG. 25, FIG. 26, FIG. 27 and FIG. 28 show a sequence of movement of the writer tray and printer tray of FIG. 22 in accordance with the present invention.

FIG. 23 shows the turntable 36 mounted on the frame 208. The recorder 212, the printer 214, and the elevator pin 98 mount adjacent the turntable 36. The recorder tray 220 extends fully. The elevator pin 98 extends through the recorder tray 220, towards the turntable 36. The disk dispenser 38 dispenses a disk 40 onto the elevator pin 98. The elevator pin 98 retracts in the direction of the arrow 230 to lowers the disk 40 onto the recorder tray 220 and continues to retract to free the recorder tray 220 from interference with the elevator pin 98 to enable the recorder tray 220 to retract. After the disk 40 is on the recorder tray 220, and the elevator 98 pin retracts, the recorder tray 220 retracts into the recorder 212 in the direction of the arrow 232 to record data on the disk 40. After data is recorded on the disk 40, the recorder tray 220 extends.

Figure 24:
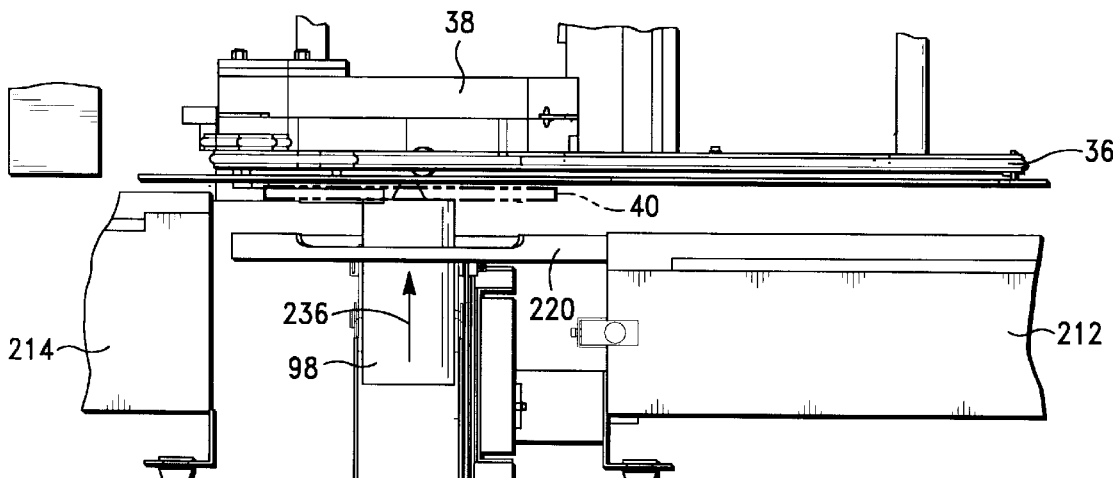

FIG. 24 shows the recorder tray 220 extended after the recorder 212 completes disk recording. The elevator pin 98 extends through the tray 220, lifting the disk 40 from the tray 220, towards the turntable 36 in the direction of the arrow 236. The next step is to print indicia on the disk 40.

Figure 25:
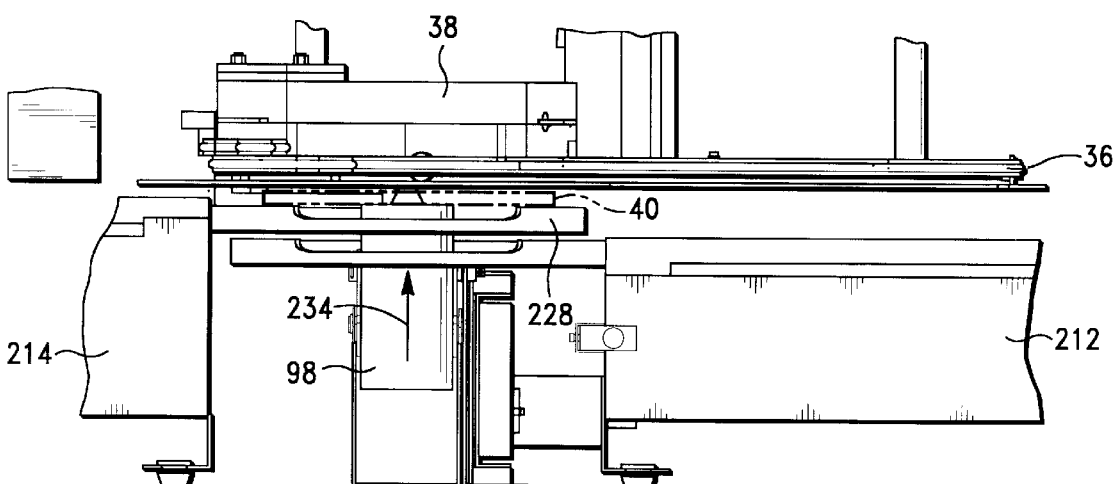

FIG. 25 shows the printer tray 228 extending. Because the printer tray 228 is bifurcated, having a U shaped opening, the printer tray 228 moves past the elevator pin 98 to adjacent the disk. The elevator pin 98 lowers the disk 40 onto the printer tray 228 in the direction of the arrow 234.

Figure 26:
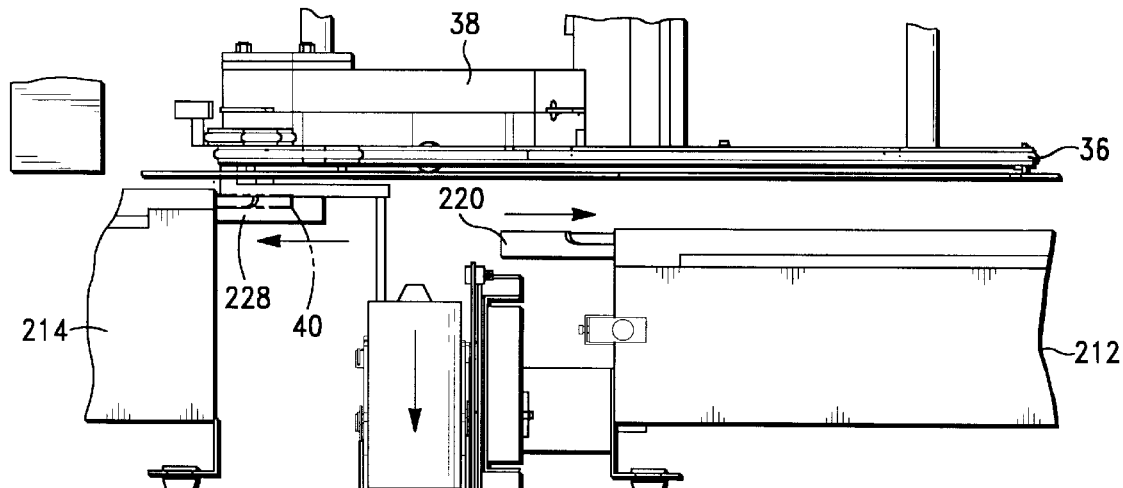

FIG. 26 shows the printer tray retracting. According to one aspect of the invention, the printer 214 prints on the disk 40 while the printer tray 228 retracts. According to another aspect of the invention, the printer 214 prints on the disk 40 when the printer tray 228 extends. According to either aspect, the printer tray 228 fully re-extends upon completion of printing.

Figure 27:
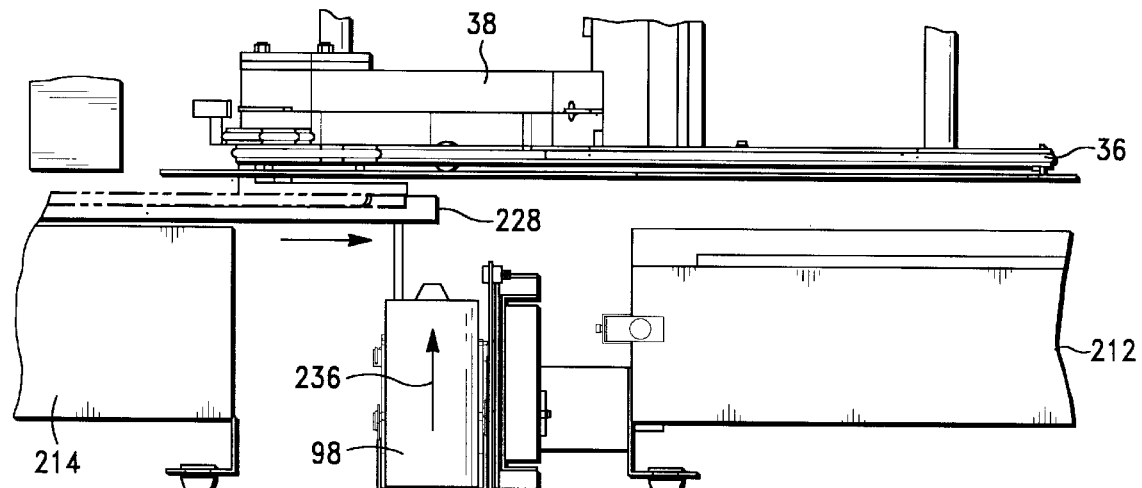

FIG. 27 shows the printer tray 228 extending towards a fully extended position. As the printer tray 228 extends, the turntable 36 rotates and the elevator pin 98 extends towards the turntable 36 in the direction of the arrow 236.

Figure 28:
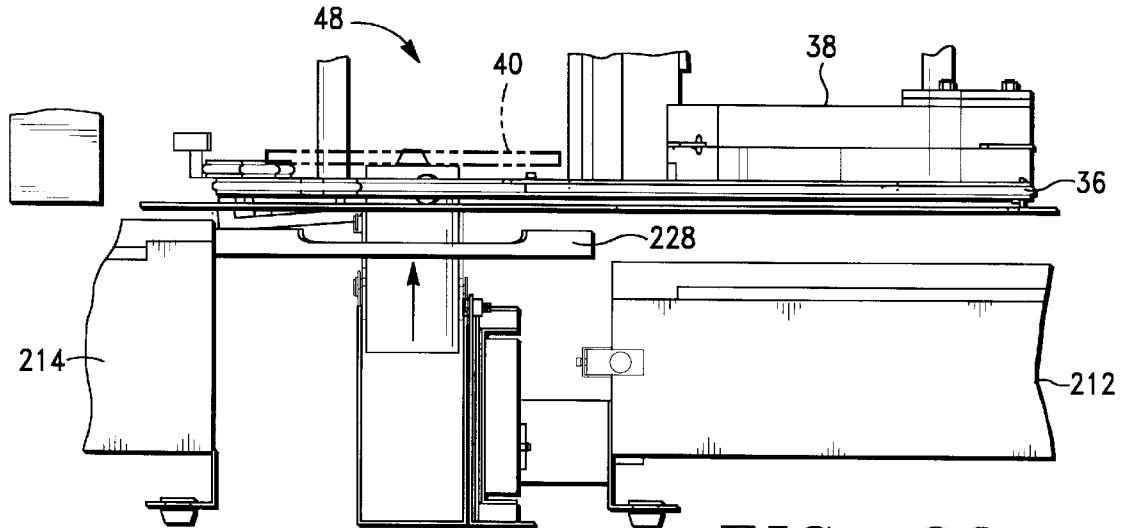

FIG. 28 shows the turntable 36 rotated to position the accept hopper 48 adjacent the elevator pin 98. The elevator pin 98 lifts the printed disk 40 from the printer tray 228. The elevator pin 98 lifts the printed disk 40 fully onto the turntable 36 into the accept hopper 48.

The turntable 36 then rotates to position the disk dispenser 38 above the elevator pin 98, another disk 40 is dispensed, and the elevator pin 98 lowers the newly dispensed disk to the recorder 212 to repeat the sequence shown in FIG. 23–FIG. 28, inclusively.

Figure 29:
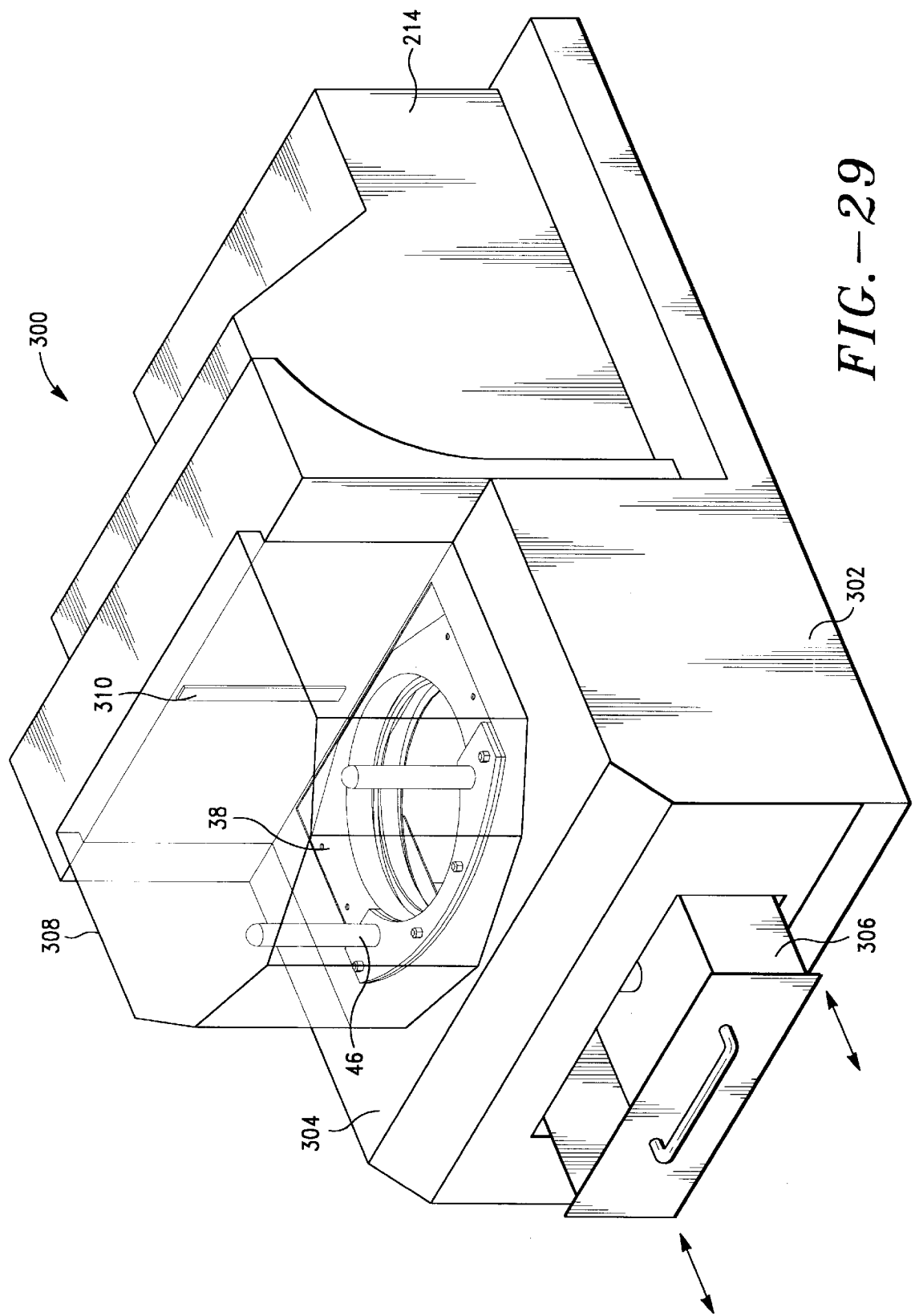
FIG. 29 shows a disk printer and a disk dispenser assembly in accordance with the present invention.

FIG. 29 shows a disk printing system, generally designated with the reference numeral 300, including a disk dispenser 38, a disk dispenser housing 302 and a printer 214. The printer 214 mounts on the disk dispenser housing 302. The disk dispenser housing 302 includes an outer cover 304, a drawer 306, and a transparent cover 308. The housing includes a vertical strip 310 for guiding disks into the disk dispenser 38. Accordingly, the housing 302 cooperates to define a portion of the feed hopper 48 for holding a stack of disks and feeding disks, one at a time, to the printer 214 via the disk dispenser 38.

The housing 302 is particularly configured to retrofit with the existing SIGNATURE™ disk printer design. Accordingly, the present invention can be used with off-the shelf model printers. The drawer 306 collects printed disks and slides to remove the printed disks from the system 300.

Figure 30:
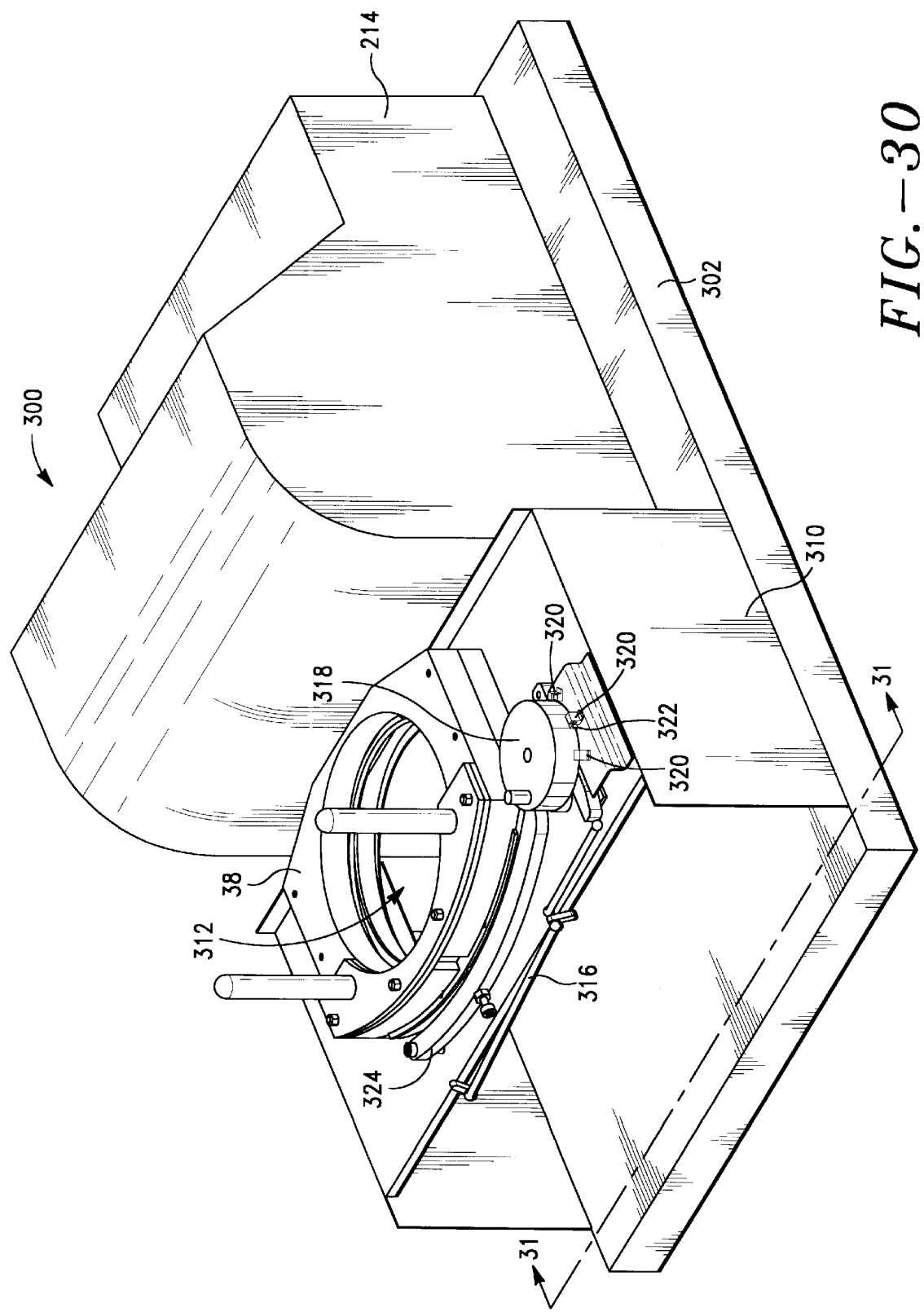
FIG. 30 shows the disk printer and disk dispenser assembly of FIG. 29 without a cover.

FIG. 30 shows the disk printing system of FIG. 29 with a portion of the housing 302 missing. The printer 214 is adjacent the disk dispenser 38. The housing 32 includes a platform 310 for holding the disk dispenser 38. The platform 310 has an opening 312. The disk dispenser 38 is affixed to the platform 310, adjacent the opening 312 to enable disks to dispense to the printer 214 via the opening 312.

The system 300 includes a linkage 316 and a cam 318. The cam 318 actuates the linkage 316 to operate the disk dispenser 38. The platform 310 includes three infrared sensors 320 mounted adjacent the cam 318. The cam 318 has an extension 322. The sensors 320 detect the presence of the extension 322 to determine the relative rotation of the cam 318 and thus, the position of the linkage 316. The linkage 316 includes a plate actuator 324 which actuates the disk dispenser plate to dispenser disks, one at a time, through the platform opening 312.

Figure 31:
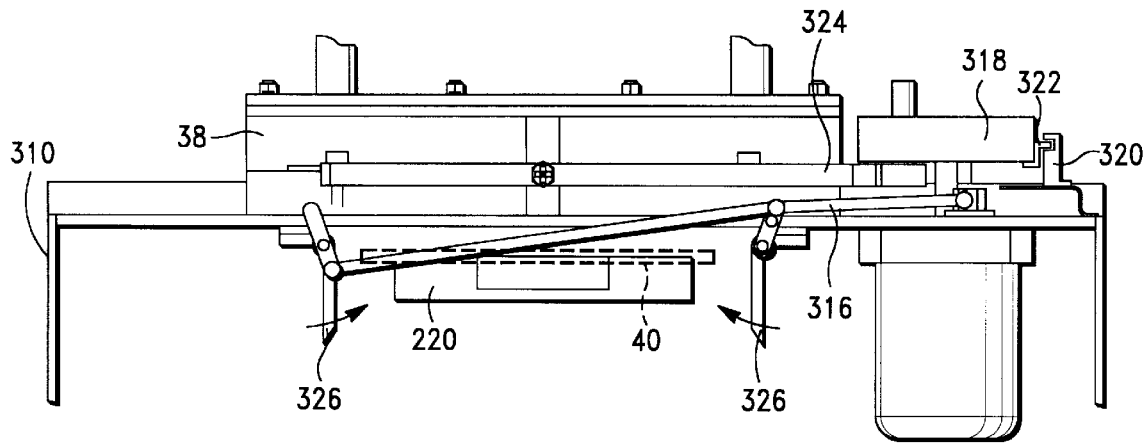
FIG. 31, FIG. 32 and FIG. 33 show a view of the assembly of FIG. 30 as seen along the line 31—31.

FIG. 31 shows the disk dispenser 38 and the tray 220 of the printer 214. The optical sensor 320 detects the presence of the extension 322. The cam 318 rotates to cause the linkage to press the plate actuator 324 against the disk dispenser plate to dispense a disk. The printer tray 220 extends. The disk 40 drops from the dispenser 38 onto the tray 220. The tray retracts to enable the printer to print indicia on the disk 40 and then extends upon completion of printing.

The platform 310 includes disk flaps 326 operatively coupled with the linkage 316. The disk flaps 326 are relaxed to enable the tray 220 and disk 40 to slide freely into and out from the printer.

Figure 32:
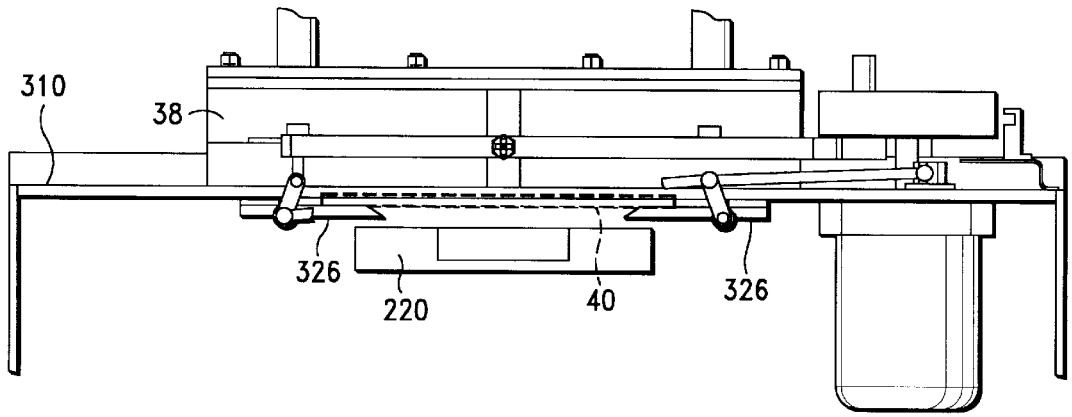

FIG. 32 shows the platform 310 and the flaps 326 lifting the printed disk 40 from the tray 220. With the disk 40 lifted, the tray 220 is free to retract, away from the disk 40 to enable the flaps 326 to release the disk 40. Rotation of the cam 318 actuates the linkage 316 to relax the flaps 326 and release the disk 40.

Figure 33:
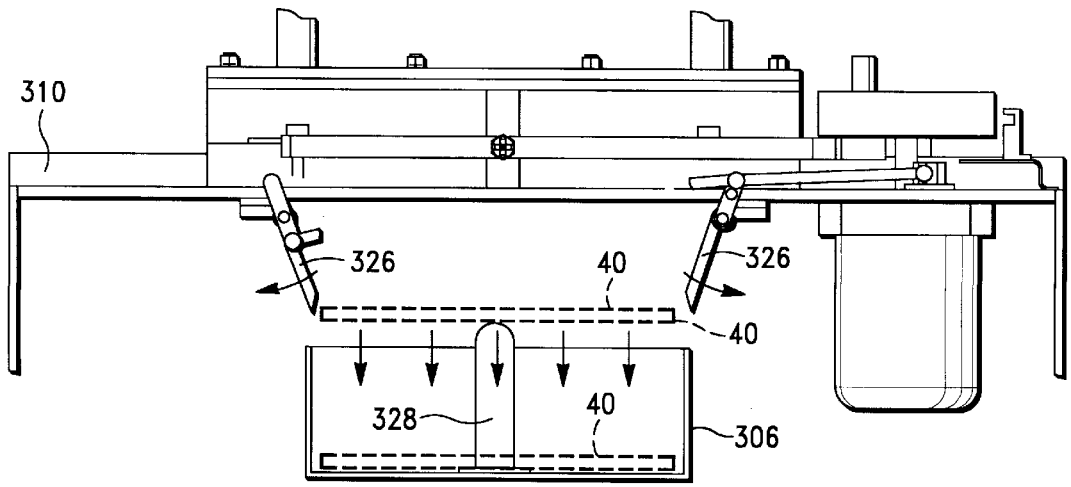

FIG. 33 shows the flaps 326 relaxing and releasing the disk. The drawer 306 is shown and includes a removable spindle 328. The flaps 326 release the disk 40 onto the spindle. The released disk 306 lands in the drawer 306 for subsequent removal. Removal of the disk 40 form the drawer entails opening the drawer 306 and grasping the spindle 328 to lift the disk 40 from the drawer.

While flaps 326 are shown to lift and release disks from the tray 220, it can be appreciated that numerous ways of removing a disk from a tray are known and can be substituted for the flaps 326 in accordance with the present invention. These ways include robotic gripper arms, elevator pins, and other lifting devices, which grip and move disks.

This detailed description describes various aspects of the present invention. This detailed description is by way of example only, and is not intended to limit the present invention. Numerous alternatives exist to the various aspects of the invention, for example, the printer need not be an ink jet printer, but instead, may be configured in any manner consistent with printing indicia on disk surfaces. Additionally, the disk dispenser may be configured any of a number of ways which enable a sliding plate, arm or prod to separate and dispense disks. With these and other variations in mind, the invention is to be limited only by the following claims.

We claim:
1. A printer and disk dispenser combination, comprising:
   a housing;
   a printer mounted on the housing for printing indicia on disks;
   an upper guide;
   a lower guide attached to the upper guide and to the housing, the lower guide includes a rim for supporting a disk, the rim defines an opening;
   a plate mounted between the lower guide and the upper guide, the plate slides between a first position and a second position to dispense disks to the printer.
2. A combination as set forth in claim 1, wherein when the upper guide and lower guide are axially offset.
3. A combination as set forth in claim 1, wherein the housing includes a turntable, the lower guide mounts on the turntable, the turntable rotates to move disks to the printer via the disk dispenser.
4. A combination as set forth in claim 3, wherein the housing includes an elevator pin the elevator pin reciprocates to move disks from the disk dispenser to the printer and from the printer to the turntable.
5. A combination as set forth in claim 1, wherein said plate has an arced edge which defines an inner periphery for circumscribing a disk.
6. A combination as set forth in claim 1, wherein the rim of the lower guide includes a support lip which extends into the opening for supporting a disk.
7. A combination as set forth in claim 6, wherein the rim has an opposing edge which opposes the support lip and cooperates with the support lip to support a disk in the lower guide.
8. A combination as set forth in claim 6, wherein the rim has an opposing edge which opposes the support lip and cooperates with the support lip to support a disk in the lower guide, when the lower guide supports a disk and the plate moves from the first position to the second position the plate pushes the disk off of the opposing edge to dispense the disk.
9. A printer and disk dispenser combination, comprising:
   a housing;
   a printer mounted on the housing for printing indicia on disks;
   an upper guide defining a circular opening and having a central axis;
   a lower guide being attached to the upper guide and to the housing, the lower guide includes a rim for supporting a disk, the rim defines a circular opening and a central axis;
   the lower guide being axially offset from the upper guide; and
   a plate mounted between the lower guide and the upper guide, the plate has an arced edge for contacting disks, the plate slides between a first position and a second position to dispense disks to the printer.

* * * * *